(12) United States Patent
Casagrande et al.

(10) Patent No.: US 9,031,385 B2
(45) Date of Patent: May 12, 2015

(54) TELEVISION RECEIVER STORAGE MANAGEMENT

(71) Applicant: EchoStar Technologies, LLC, Englewood, CO (US)

(72) Inventors: Steven Michael Casagrande, Castle Pines, CO (US); Yunfeng Yang, Aurora, CO (US); Mark Templeman, Parker, CO (US); Kranti Kumar Kilaru, Castle Rock, CO (US); Germar Schaefer, Monument, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 34 days.

(21) Appl. No.: 13/800,477

(22) Filed: Mar. 13, 2013

(65) Prior Publication Data

US 2013/0243399 A1    Sep. 19, 2013

Related U.S. Application Data

(60) Provisional application No. 61/611,483, filed on Mar. 15, 2012.

(51) Int. Cl.
    *H04N 5/76*    (2006.01)
    *G11B 27/28*    (2006.01)
    (Continued)

(52) U.S. Cl.
    CPC .................. *G11B 27/28* (2013.01); *H04N 5/91* (2013.01); *H04N 5/50* (2013.01); *H04N 9/87* (2013.01);
    (Continued)

(58) Field of Classification Search
    CPC ................... H04N 21/47214; H04N 21/4826; H04N 9/797
    See application file for complete search history.

(56) References Cited

U.S. PATENT DOCUMENTS

| 4,706,121 A | 11/1987 | Young |
| 4,723,246 A | 2/1988 | Weldon, Jr. |

(Continued)

FOREIGN PATENT DOCUMENTS

| CN | 101404780 A | 4/2009 |
| EP | 0 903 743 A | 3/1999 |

(Continued)

OTHER PUBLICATIONS

International Search Report and Written Opinion of PCT/US2012/51992 mailed Nov. 2, 2012, 15 pages.

(Continued)

*Primary Examiner* — Huy T Nguyen
(74) *Attorney, Agent, or Firm* — Kilpatrick Townsend & Stockton LLP

(57) ABSTRACT

Various arrangements for managing television programming storage at a television receiver are presented. User input specifying a number of days for retention of each managed array of a plurality of managed arrays of television channels to be recorded by the television receiver may be received. A television service provider may select a plurality of television channels for recording as the plurality of managed arrays of television channels. Also, the television service provider may define times for recording of the plurality of television channels of the plurality of managed arrays of television channels. A first amount of storage space for storage of the plurality of managed arrays of television channels may be calculated based on the number of days for retention. The first amount of storage space of a storage medium to the plurality of managed arrays of television channels may be allocated.

21 Claims, 8 Drawing Sheets

(51) Int. Cl.

| | | |
|---|---|---|
| *H04N 5/91* | (2006.01) | |
| *H04N 5/50* | (2006.01) | |
| *H04N 9/87* | (2006.01) | |
| *H04N 9/79* | (2006.01) | |
| *H04N 21/472* | (2011.01) | |
| *H04N 9/797* | (2006.01) | |
| *H04N 5/782* | (2006.01) | |
| *H04N 21/426* | (2011.01) | |
| *H04N 21/433* | (2011.01) | |
| *H04N 5/44* | (2011.01) | |
| *H04N 21/482* | (2011.01) | |
| *H04N 7/20* | (2006.01) | |

(52) U.S. Cl.
CPC .............. *H04N 9/79* (2013.01); *H04N 21/4826* (2013.01); *H04N 21/47217* (2013.01); *H04N 21/482* (2013.01); *H04N 7/20* (2013.01); *H04N 9/797* (2013.01); *H04N 5/782* (2013.01); *H04N 21/4263* (2013.01); *H04N 21/4334* (2013.01); *H04N 21/47214* (2013.01); *H04N 5/4401* (2013.01); *H04N 5/76* (2013.01)

(56) References Cited

U.S. PATENT DOCUMENTS

| | | | |
|---|---|---|---|
| 4,802,215 | A | 1/1989 | Mason |
| 5,187,589 | A | 2/1993 | Kono et al. |
| 5,335,277 | A | 8/1994 | Harvey et al. |
| 5,483,277 | A | 1/1996 | Granger |
| 5,488,658 | A | 1/1996 | Hirashima |
| 5,541,738 | A | 7/1996 | Mankovitz |
| 5,642,153 | A | 6/1997 | Chaney et al. |
| 5,684,969 | A | 11/1997 | Ishida |
| 5,805,763 | A | 9/1998 | Lawler et al. |
| 5,974,218 | A | 10/1999 | Nagasaka et al. |
| 6,628,891 | B1 | 9/2003 | Vantalon et al. |
| 6,701,528 | B1 | 3/2004 | Arsenault et al. |
| 6,766,523 | B2 | 7/2004 | Herley |
| 6,798,971 | B2 | 9/2004 | Potrebic |
| 6,938,208 | B2 | 8/2005 | Reichardt |
| 7,024,676 | B1 | 4/2006 | Klopfenstein |
| 7,409,140 | B2 | 8/2008 | Rodriguez et al. |
| 7,487,529 | B1 | 2/2009 | Orlick |
| 7,490,169 | B1 | 2/2009 | Ogdon et al. |
| 7,493,312 | B2 | 2/2009 | Liu et al. |
| 7,542,656 | B2 | 6/2009 | Cho et al. |
| 7,577,751 | B2 | 8/2009 | Vinson et al. |
| 7,590,993 | B1 | 9/2009 | Hendricks et al. |
| 7,715,552 | B2 | 5/2010 | Pinder et al. |
| 7,730,517 | B1 | 6/2010 | Rey et al. |
| 7,739,711 | B2 | 6/2010 | Finseth et al. |
| 7,760,986 | B2 | 7/2010 | Beuque |
| 7,804,861 | B2 | 9/2010 | Kim |
| 7,848,618 | B2 | 12/2010 | Potrebic et al. |
| 7,856,557 | B2 | 12/2010 | Beuque |
| 7,926,078 | B2 | 4/2011 | Arsenault et al. |
| 7,929,697 | B2 | 4/2011 | McNeely et al. |
| 7,962,937 | B2 | 6/2011 | Cho et al. |
| 8,006,268 | B2 | 8/2011 | Sloo |
| 8,201,194 | B2 | 6/2012 | Wijnands et al. |
| 8,321,466 | B2 | 11/2012 | Black et al. |
| 8,437,622 | B2 | 5/2013 | Casagrande |
| 8,447,170 | B2 | 5/2013 | Casagrande |
| 8,566,873 | B2 | 10/2013 | Sie et al. |
| 8,584,167 | B2 | 11/2013 | Vanduyn |
| 8,606,088 | B2 | 12/2013 | Kummer et al. |
| 8,627,349 | B2 | 1/2014 | Kirby et al. |
| 8,660,412 | B2 | 2/2014 | Kummer et al. |
| 8,763,027 | B2 | 6/2014 | Martch |
| 8,774,608 | B2 | 7/2014 | Kummer et al. |
| 8,819,722 | B2 | 8/2014 | Kummer et al. |
| 8,819,761 | B2 | 8/2014 | Minnick |
| 8,850,476 | B2 | 9/2014 | Vanduyn et al. |
| 8,867,893 | B2 | 10/2014 | Kirby |
| 8,959,544 | B2 | 2/2015 | Kummer et al. |
| 8,959,566 | B2 | 2/2015 | Kummer |
| 2001/0028782 | A1 | 10/2001 | Ohno et al. |
| 2001/0033736 | A1 | 10/2001 | Yap et al. |
| 2001/0034787 | A1 | 10/2001 | Takao et al. |
| 2002/0044658 | A1 | 4/2002 | Wasilewski et al. |
| 2002/0054752 | A1 | 5/2002 | Wood et al. |
| 2002/0055343 | A1 | 5/2002 | Stetzler et al. |
| 2002/0087979 | A1 | 7/2002 | Dudkiewicz et al. |
| 2002/0087983 | A1 | 7/2002 | Son et al. |
| 2002/0092021 | A1 | 7/2002 | Yap et al. |
| 2002/0095510 | A1 | 7/2002 | Sie et al. |
| 2002/0097340 | A1 | 7/2002 | Takagi et al. |
| 2002/0144266 | A1 | 10/2002 | Goldman et al. |
| 2002/0152299 | A1 | 10/2002 | Traversat et al. |
| 2002/0164147 | A1 | 11/2002 | Suda |
| 2002/0168178 | A1 | 11/2002 | Rodriguez et al. |
| 2002/0188943 | A1 | 12/2002 | Freeman et al. |
| 2003/0026423 | A1 | 2/2003 | Unger et al. |
| 2003/0078930 | A1 | 4/2003 | Surcouf et al. |
| 2003/0110514 | A1 | 6/2003 | West et al. |
| 2003/0152360 | A1 | 8/2003 | Mukai et al. |
| 2003/0156826 | A1 | 8/2003 | Sonoda et al. |
| 2003/0177495 | A1 | 9/2003 | Needham et al. |
| 2003/0200548 | A1 | 10/2003 | Baran et al. |
| 2003/0208763 | A1 | 11/2003 | McElhatten et al. |
| 2004/0001087 | A1 | 1/2004 | Warmus et al. |
| 2004/0015992 | A1 | 1/2004 | Hasegawa et al. |
| 2004/0015999 | A1 | 1/2004 | Carlucci et al. |
| 2004/0103428 | A1 | 5/2004 | Seok et al. |
| 2004/0128682 | A1 | 7/2004 | Liga et al. |
| 2004/0162871 | A1 | 8/2004 | Pabla et al. |
| 2004/0218905 | A1 | 11/2004 | Green et al. |
| 2004/0242150 | A1 | 12/2004 | Wright et al. |
| 2004/0268387 | A1 | 12/2004 | Wendling |
| 2005/0083865 | A1 | 4/2005 | Ashley et al. |
| 2005/0120049 | A1 | 6/2005 | Kanegae et al. |
| 2005/0125683 | A1 | 6/2005 | Matsuyama et al. |
| 2005/0147383 | A1 | 7/2005 | Ihara |
| 2005/0229213 | A1 | 10/2005 | Ellis et al. |
| 2005/0271365 | A1 | 12/2005 | Hisatomi |
| 2005/0273819 | A1 | 12/2005 | Knudson et al. |
| 2006/0010464 | A1 | 1/2006 | Tomohiro |
| 2006/0020962 | A1 | 1/2006 | Stark et al. |
| 2006/0056800 | A1 | 3/2006 | Shimagami et al. |
| 2006/0075434 | A1 | 4/2006 | Chaney et al. |
| 2006/0206819 | A1 | 9/2006 | Tsuji et al. |
| 2006/0212900 | A1 | 9/2006 | Ismail et al. |
| 2006/0215993 | A1 | 9/2006 | Yamada |
| 2006/0274208 | A1 | 12/2006 | Pedlow, Jr. |
| 2007/0016546 | A1 | 1/2007 | De Vorchik et al. |
| 2007/0039032 | A1 | 2/2007 | Goldey et al. |
| 2007/0061378 | A1* | 3/2007 | Lee et al. ............. 707/200 |
| 2007/0157253 | A1 | 7/2007 | Ellis et al. |
| 2007/0165855 | A1 | 7/2007 | Inui |
| 2007/0192586 | A1 | 8/2007 | McNeely |
| 2007/0204288 | A1 | 8/2007 | Candelore |
| 2007/0234395 | A1 | 10/2007 | Dureau et al. |
| 2007/0258596 | A1 | 11/2007 | Kahn et al. |
| 2008/0046929 | A1 | 2/2008 | Cho et al. |
| 2008/0092164 | A1 | 4/2008 | Agarwal et al. |
| 2008/0104534 | A1 | 5/2008 | Park et al. |
| 2008/0137850 | A1 | 6/2008 | Mamidwar |
| 2008/0141322 | A1 | 6/2008 | Jang et al. |
| 2008/0152039 | A1 | 6/2008 | Shah et al. |
| 2008/0184327 | A1 | 7/2008 | Ellis et al. |
| 2008/0216119 | A1 | 9/2008 | Pfeffer et al. |
| 2008/0216136 | A1 | 9/2008 | Pfeffer et al. |
| 2008/0222678 | A1 | 9/2008 | Burke et al. |
| 2008/0222681 | A1 | 9/2008 | Kwon |
| 2008/0271077 | A1 | 10/2008 | Kim et al. |
| 2008/0273698 | A1 | 11/2008 | Manders et al. |
| 2008/0276284 | A1 | 11/2008 | Bumgardner et al. |
| 2008/0288461 | A1 | 11/2008 | Glennon et al. |
| 2008/0291206 | A1 | 11/2008 | Uchimura et al. |
| 2008/0298585 | A1 | 12/2008 | Maillard et al. |
| 2008/0301740 | A1 | 12/2008 | Tsutsui |
| 2009/0051579 | A1 | 2/2009 | Inaba et al. |

(56) References Cited

U.S. PATENT DOCUMENTS

| | | |
|---|---|---|
| 2009/0067621 A9 | 3/2009 | Wajs |
| 2009/0080930 A1 | 3/2009 | Shinotsuka et al. |
| 2009/0100466 A1 | 4/2009 | Migos |
| 2009/0129749 A1 | 5/2009 | Oyamatsu et al. |
| 2009/0165057 A1 | 6/2009 | Miller et al. |
| 2009/0172722 A1 | 7/2009 | Kahn et al. |
| 2009/0178098 A1 | 7/2009 | Westbrook et al. |
| 2009/0254962 A1 | 10/2009 | Hendricks et al. |
| 2009/0260038 A1 | 10/2009 | Acton et al. |
| 2009/0320073 A1 | 12/2009 | Reisman |
| 2010/0020794 A1 | 1/2010 | Cholas et al. |
| 2010/0037282 A1 | 2/2010 | Iwata et al. |
| 2010/0050225 A1 | 2/2010 | Bennett |
| 2010/0086277 A1 | 4/2010 | Craner |
| 2010/0100899 A1 | 4/2010 | Bradbury et al. |
| 2010/0115121 A1 | 5/2010 | Roos et al. |
| 2010/0135639 A1* | 6/2010 | Ellis et al. ............ 386/83 |
| 2010/0146581 A1 | 6/2010 | Erk |
| 2010/0154847 A1 | 6/2010 | Haltmayer et al. |
| 2010/0158479 A1 | 6/2010 | Craner |
| 2010/0158480 A1 | 6/2010 | Jung et al. |
| 2010/0169926 A1 | 7/2010 | Westberg et al. |
| 2010/0195827 A1 | 8/2010 | Lee et al. |
| 2010/0232604 A1 | 9/2010 | Eklund, II |
| 2010/0235862 A1 | 9/2010 | Adachi |
| 2010/0239228 A1 | 9/2010 | Sano |
| 2010/0247067 A1 | 9/2010 | Gratton |
| 2010/0265391 A1 | 10/2010 | Muramatsu et al. |
| 2010/0284537 A1 | 11/2010 | Inbar |
| 2010/0313222 A1 | 12/2010 | Lee et al. |
| 2011/0001879 A1 | 1/2011 | Goldey et al. |
| 2011/0007218 A1 | 1/2011 | Moran et al. |
| 2011/0043652 A1 | 2/2011 | King et al. |
| 2011/0078750 A1 | 3/2011 | Tam et al. |
| 2011/0131413 A1 | 6/2011 | Moon et al. |
| 2011/0138169 A1 | 6/2011 | Michel |
| 2011/0162011 A1 | 6/2011 | Hassell et al. |
| 2011/0179453 A1 | 7/2011 | Poniatowski |
| 2011/0225616 A1* | 9/2011 | Ellis ............... 725/93 |
| 2011/0239249 A1 | 9/2011 | Murison et al. |
| 2011/0255002 A1 | 10/2011 | Witheiler |
| 2011/0311045 A1 | 12/2011 | Candelore et al. |
| 2012/0278837 A1 | 11/2012 | Curtis et al. |
| 2012/0296745 A1 | 11/2012 | Harper et al. |
| 2012/0311534 A1 | 12/2012 | Fox et al. |
| 2012/0311634 A1 | 12/2012 | Van Duyn |
| 2013/0014146 A1 | 1/2013 | Bhatia et al. |
| 2013/0014159 A1 | 1/2013 | Wiser et al. |
| 2013/0051555 A1 | 2/2013 | Martch et al. |
| 2013/0051758 A1 | 2/2013 | Kummer et al. |
| 2013/0051764 A1 | 2/2013 | Casagrande |
| 2013/0051766 A1 | 2/2013 | Martch et al. |
| 2013/0051773 A1 | 2/2013 | Casagrande |
| 2013/0054579 A1 | 2/2013 | Kennedy |
| 2013/0055304 A1 | 2/2013 | Kirby et al. |
| 2013/0055305 A1 | 2/2013 | Martch et al. |
| 2013/0055310 A1 | 2/2013 | VanDuyn et al. |
| 2013/0055311 A1 | 2/2013 | Kirby et al. |
| 2013/0055314 A1 | 2/2013 | Martch |
| 2013/0055333 A1 | 2/2013 | Kummer |
| 2013/0216208 A1 | 8/2013 | Kummer et al. |
| 2013/0223814 A1 | 8/2013 | Casagrande |
| 2013/0243397 A1 | 9/2013 | Minnick et al. |
| 2013/0243398 A1 | 9/2013 | Templeman et al. |
| 2013/0243401 A1 | 9/2013 | Casagrande |
| 2013/0243402 A1 | 9/2013 | Kummer et al. |
| 2013/0243403 A1 | 9/2013 | Martch |
| 2013/0243405 A1 | 9/2013 | Templeman et al. |
| 2013/0243406 A1 | 9/2013 | Kirby |
| 2013/0247089 A1 | 9/2013 | Kummer et al. |
| 2013/0247090 A1 | 9/2013 | Kummer et al. |
| 2013/0247106 A1 | 9/2013 | Martch et al. |
| 2013/0247107 A1 | 9/2013 | Templeman |
| 2013/0247111 A1 | 9/2013 | Templeman et al. |
| 2013/0247115 A1 | 9/2013 | Minnick |
| 2013/0298166 A1 | 11/2013 | Herrington et al. |
| 2013/0347037 A1 | 12/2013 | Soroushian |
| 2014/0047477 A1 | 2/2014 | Vanduyn |
| 2014/0050462 A1 | 2/2014 | Kummer et al. |
| 2014/0126889 A1 | 5/2014 | Kummer et al. |
| 2014/0130094 A1 | 5/2014 | Kirby et al. |
| 2014/0341377 A1 | 11/2014 | Kummer et al. |
| 2014/0344858 A1 | 11/2014 | Minnick |
| 2014/0363139 A1 | 12/2014 | Kirby |

FOREIGN PATENT DOCUMENTS

| | | |
|---|---|---|
| EP | 0 973 333 A | 1/2000 |
| EP | 1 168 347 A | 1/2002 |
| EP | 1372339 A2 | 12/2003 |
| EP | 1742467 A2 | 1/2007 |
| EP | 2 018 059 A1 | 1/2009 |
| EP | 1 667 452 B1 | 11/2011 |
| EP | 2826197 A1 | 1/2015 |
| EP | 2826238 A1 | 1/2015 |
| IN | 9740/CHENP/2013 A | 9/2014 |
| JP | 2007116525 | 5/2007 |
| WO | 02/41625 A1 | 5/2002 |
| WO | 2004/057610 A1 | 7/2004 |
| WO | 2008/010689 A1 | 1/2008 |
| WO | 2008/060486 A2 | 5/2008 |
| WO | 2011/027236 A1 | 3/2011 |
| WO | 2013/028824 A3 | 2/2013 |
| WO | 2013/028835 A1 | 2/2013 |
| WO | 2013/138606 A1 | 9/2013 |
| WO | 2013/138608 A1 | 9/2013 |
| WO | 2013/138610 A1 | 9/2013 |
| WO | 2013/138638 A1 | 9/2013 |
| WO | 2013/138689 A1 | 9/2013 |
| WO | 2013/138740 A1 | 9/2013 |

OTHER PUBLICATIONS

International Search Report and Written Opinion of PCT/US2012/51987 mailed Oct. 23, 2012, 20 pages.

International Search Report and Written Opinion of PCT/US2012/051984 mailed Nov. 5, 2012, 13 pages.

International Search Report and Written Opinion of PCT/US2012/52002 mailed Oct. 16, 2012, 17 pages.

International Preliminary Report on Patentability for PCT/US2012/052002 mailed on Apr. 17, 2014, 10 pages.

International Search Report and Written Opinion of PCT/US2012/51964 mailed Nov. 2, 2012, 13 pages.

International Search Report and Written Opinion of PCT/US2012/052011 mailed Dec. 17, 2012, 44 pages.

International Preliminary Report on Patentability, PCT/US2012/052011, mailed on Mar. 6, 2014, 6 pages.

International Preliminary Report on Patentability, PCT/US2012/051984, mailed on Mar. 6, 2014, 8 pages.

International Preliminary Report on Patentability, PCT/US2012/051964, mailed on Apr. 10, 2014, 7 pages.

International Preliminary Report on Patentability, PCT/US2012/051992, mailed on Apr. 3, 2014, 7 pages.

International Preliminary Report on Patentability, PCT/US2012/051987, mailed on Mar. 6, 2014, 7 pages.

Author Unknown, "Move Networks is Delivering the Next Generation of Television," Move Networks, 2010, obtained online at http://movenetworks.com/, 2 pages.

Jung, J., et al., "Design and Implementation of a Multi-Stream CableCARD with a High-Speed DVB-Common Descrambler," ACM Multimedia, 2006, 4 pages.

U.S. Appl. No. 13/149,852, filed May 31, 2011, Non-Final Office Action mailed Dec. 12, 2012, 9 pages.

U.S. Appl. No. 13/149,852, filed May 31, 2011, Final Office Action mailed Mar. 26, 2013, 13 pages.

U.S. Appl. No. 13/149,852, filed May 31, 2011, Notice of Allowance mailed Jul. 11, 2013, 13 pages.

U.S. Appl. No. 13/286,157, filed Oct. 31, 2011, Non-Final Office Action mailed Jan. 17, 2013, 20 pages.

(56) References Cited

OTHER PUBLICATIONS

U.S. Appl. No. 13/286,157, filed Oct. 31, 2011, Non-Final Office Action mailed Jul. 25, 2013, 49 pages.
U.S. Appl. No. 13/286,157, filed Oct. 31, 2011, Notice of Allowance mailed Feb. 3, 2014, 81 pages.
U.S. Appl. No. 13/215,702, filed Aug. 23, 2011, Notice of Allowance mailed Feb. 11, 2013, 13 pages.
U.S. Appl. No. 13/288,002, filed Nov. 2, 2011, Non-final Office Action mailed Sep. 26, 2013, 15 pages.
U.S. Appl. No. 13/288,002, filed Nov. 2, 2011, Final Office Action mailed Mar. 27, 2014, 20 pages.
U.S. Appl. No. 13/302,852, filed Nov. 22, 2011, Non-Final Rejection mailed May 23, 2013, 19 pages.
U.S. Appl. No. 13/302,852, filed Nov. 22, 2011, Final Rejection mailed Dec. 9, 2013, 23 pages.
U.S. Appl. No. 13/324,831, filed Dec. 13, 2011 Non-Final Office Action mailed Feb. 28, 2013, 23 pages.
U.S. Appl. No. 13/324,831, filed Dec. 13, 2011 Notice of Allowance mailed Sep. 4, 2013, 22 pages.
U.S. Appl. No. 13/292,047, filed Nov. 8, 2011 Non-Final Office Action mailed Jan. 18, 2013, 17 pages.
U.S. Appl. No. 13/292,047, filed Nov. 8, 2011 Final Office Action mailed Aug. 19, 2013, 17 pages.
U.S. Appl. No. 13/614,899, filed Sep. 13, 2012 Non-Final Office Action mailed Feb. 5, 2013, 17 pages.
U.S. Appl. No. 13/614,899, filed Sep. 13, 2012, Non-Final Office Action mailed Sep. 17, 2013, 17 pages.
U.S. Appl. No. 13/614,899, filed Sep. 13, 2012, Final Office Action mailed Mar. 17, 2014, 41 pages.
U.S. Appl. No. 13/291,014, filed Nov. 7, 2011, Non-Final Office Action mailed Mar. 29, 2013, 21 pages.
U.S. Appl. No. 13/291,014, filed Nov. 7, 2011, Notice of Allowance mailed Aug. 7, 2013, 16 pages.
U.S. Appl. No. 13/215,598, filed Aug. 23, 2011, Non-Final Office Action mailed Jun. 20, 2013, 15 pages.
U.S. Appl. No. 13/215,598, filed Aug. 23, 2011, Final Office Action mailed Nov. 21, 2013, 23 pages.
U.S. Appl. No. 13/215,598, filed Aug. 23, 2011, Non-Final Office Action mailed Feb. 6, 2014, 12 pages.
U.S. Appl. No. 13/215,655, filed Aug. 23, 2011, Non-Final Office Action mailed Sep. 6, 2013, 27 pages.
U.S. Appl. No. 13/215,655, filed Aug. 23, 2011, Final Office Action mailed Dec. 18, 2013, 20 pages.
U.S. Appl. No. 13/215,916, filed Aug. 23, 2011, Notice of Allowance mailed Jan. 4, 2013, 10 pages.
U.S. Appl. No. 13/294,005, filed Nov. 11, 2011, Non-Final Office Action mailed Aug. 14, 2013, 32 pages.
U.S. Appl. No. 13/294,005, filed Nov. 11, 2011, Final Office Action mailed Jan. 3, 2014, 29 pages.
U.S. Appl. No. 13/592,976, filed Aug. 23, 2012, Notice of Allowance mailed Oct. 7, 2013, 18 pages.
U.S. Appl. No. 13/797,173, filed Mar. 12, 2013, Non Final Office Action mailed May 15, 2014, 28 pages.
U.S. Appl. No. 13/799,653, filed Mar. 13, 2013, Non Final Office Action mailed May 8, 2014, 24 pages.
U.S. Appl. No. 13/829,350, filed Mar. 14, 2013, Non Final Office Action mailed Feb. 28, 2014, 29 pages.
U.S. Appl. No. 13/828,001, filed Mar. 14, 2013, Notice of Allowance mailed Apr. 25, 2014, 43 pages.
U.S. Appl. No. 13/799,719, filed Mar. 13, 2013, Non Final Office Action mailed Oct. 25, 2013, 79 pages.
U.S. Appl. No. 13/799,719, filed Mar. 13, 2013, Notice of Allowance mailed Apr. 23, 2014, 141 pages.
U.S. Appl. No. 14/064,423, filed Oct. 28, 2013, Non-Final Office Action mailed Dec. 20, 2013, 18 pages.
U.S. Appl. No. 14/064,423, filed Oct. 28, 2013, Notice of Allowance mailed Mar. 4, 2013, 37 pages.
International Search Report and Written Opinion of PCT/US2013/32176 mailed on Jun. 25, 2013, 15 pages.
International Search Report and Written Opinion of PCT/US2013/031565 mailed on May 31, 2013, 103 pages.
International Search Report and Written Opinion of PCT/US2013/031915 mailed on Jun. 3, 2013, 7 pages.
International Search Report of PCT/KR2007/003521 mailed on Oct. 23, 2007.
International Search Report of PCT/IB2003/005737 mailed on Mar. 3, 2004.
Jensen, Craig, "Fragmentation: the condition, the cause, the cure" 'Online!, Executive Software International, 1994; retrieved from Internet: <URL: www.executive.com/fragbook/fragbook.htm> retrieved on Mar. 2, 2004! Chapter; "How a disk works", Section: "The Original Problem".
U.S. Appl. No. 13/795,914, filed Mar. 6, 2013, Non-Final Office Action mailed Oct. 11, 2013, 17 pages.
U.S. Appl. No. 13/757,168, filed Feb. 1, 2013 Non Final Office Action mailed Jun. 4, 2014, 23 pages.
U.S. Appl. No. 13/799,604, filed Mar. 13, 2013 Non Final Office Action mailed Jun. 6, 2014, 24 pages.
U.S. Appl No. 13/614,899, filed Sep. 13, 2012 Non-Final Office Action mailed May 20, 2014, 25 pages.
U.S. Appl. No. 13/215,598, filed Aug 23, 2011 Final Office Action mailed Jul. 2, 2014, 22 pages.
U.S. Appl. No. 13/294,005, filed Nov. 11, 2011 Non-Final Office Action mailed May 20, 2014, 33 pages.
U.S. Appl. No. 13/829,350, filed Mar. 14, 2013 Non Final Office Action mailed Jul. 29, 2014, 24 pages.
U.S. Appl. No. 13/795,914, filed Mar. 6, 2013 Notice of Allowance mailed Jul. 21, 2014, 13 pages.
U.S. Appl. No. 13/795,914, filed Mar. 6, 2013 Final Office Action mailed Apr. 3, 2014, 17 pages.
Author Unknown, "EE Launches home TV service in UK," dated Oct. 8, 2014, 3 pages. Retrieved on Oct. 13, 2014 from http://www.bbc.com/news/technology-29535279.
Author Unknown, "EE TV Its simply great television," Accessed on Oct. 13, 2014, 11 pages. Retrieved from https//ee.co.uk/ee-and-me/ee-tv.
McCann, John, "EE TV set top takes aim at Sky, Virgin Media and YouView," dated Oct. 8, 2014, 5 pages. Retrieved on Oct. 13, 2014 from http://www.techradar.com/news/television/ee-tv-set-top-box-takes-aim-at-sky-virgin-media-and-youview-1268223.
Williams, Christopher, "EE to launch TV set-top box," dated Oct. 7, 2014, 2 pages. Retrieved on Oct. 13, 2014 from http://www.telegraph.co.uk/finance/newsbysector/mediatechnologyandtelecoms/telecoms/11147319/EE-to-launch-TV-set-top-box.html.
Extended European Search Report for EP 12825080 mailed Sep. 11, 2014, 10 pages.
Extended European Search Report for EP 12825521 mailed Nov. 24, 2014, 7 pages.
International Search Report and Written Opinion of PCT/US2013/031440 mailed May 30, 2013, 14 pages.
International Preliminary Report on Patentability for PCT/US2013/031440 mailed Sep. 25, 2014, 8 pages.
The Office Action dated Nov. 6, 2014 for Mexican Patent Application No. MX/a/2013/014677, 2 pages.
U.S. Appl. No. 14/095,860, filed Dec. 3, 2013 Non-Final Office Action mailed Dec. 26, 2014, 45 pages.
U.S. Appl. No. 14/043,617, filed Oct. 1, 2013 Non-Final Office Action mailed Jan. 5, 2015, 45 pages.
U.S. Appl. No. 13/856,752, filed Apr. 4, 2013, Non Final Office Action mailed Nov. 5, 2014, 34 pages.
U.S. Appl. No. 13/829,350, filed Mar. 14, 2013 Final Office Action mailed Jan. 23, 2015, 18 pages.
U.S. Appl. No. 13/799,653, filed Mar. 13, 2013, Notice of Allowance mailed Nov. 26, 2014, 32 pages.
U.S. Appl. No. 13/797,173, filed Mar. 12, 2013, Notice of Allowance mailed Nov. 24, 2014, 37 pages.
U.S. Appl. No. 13/757,168, filed Feb. 1, 2013, Notice of Allowance mailed Oct. 14, 2014, 28 pages.
U.S. Appl. No. 13/294,005, filed Nov. 11, 2011, Notice of Allowance mailed Oct. 31, 2014, 24 pages.
U.S. Appl. No. 13/292,047, filed Nov. 8, 2011, Final Office Action mailed Jan. 13, 2015, 22 pages.

(56) References Cited

OTHER PUBLICATIONS

U.S. Appl. No. 13/215,598, filed Aug. 23, 2011, Non-Final Office Action mailed Nov. 25, 2014, 18 pages.
International Search Report and Written Opinion of PCT/US2013/031432 mailed May 28, 2013, 10 pages.
International Preliminary Report on Patentability for PCT/US2013/031432 issued Sep. 16, 2014, 9 pages.
International Search Report and Written Opinion of PCT/US2013/031445 mailed May 24, 2013, 11 pages.
International Preliminary Report on Patentability for PCT/US2013/031445 issued Sep. 16, 2014, 10 pages.
International Preliminary Report on Patentability for PCT/US2013/032176 mailed Sep. 25, 2014, 7 pages.
International Preliminary Report on Patentability for PCT/US2013/031565 issued Sep. 16, 2014, 18 pages.
International Preliminary Report on Patentability for PCT/US2013/031915 issued Sep. 16, 2014, 5 pages.
U.S. Appl. No. 13/302,852, filed Nov. 22, 2011 Non-Final Rejection mailed Sep. 2, 2014, 28 pages.
U.S. Appl. No. 13/793,636, filed Mar. 11, 2013 Non-Final Office Action mailed Sep. 29, 2014, 27 pages.
Extended European Search Report for EP 12825474 mailed Jan. 7, 2015, 6 pages.
Extended European Search Report for EP 12825430 mailed Jan. 26, 2015, 9 pages.
U.S. Appl. No. 13/799,604, filed Mar. 13, 2013, Final Office Action mailed Jan. 14, 2015, 36 pages.
U.S. Appl. No. 13/797,173, filed Mar. 12, 2013 Notice of Allowance mailed Feb. 26, 2015, 19 pages.
U.S. Appl. No. 13/793,636, filed Mar. 11, 2013, Notice of Allowance mailed Jan. 28, 2015, 43 pages.
U.S. Appl. No. 13/800,477, filed Mar. 13, 2013 Notice of Allowance mailed Feb. 18, 2015, 18 pages.

\* cited by examiner

TELEVISION RECEIVER STORAGE MANAGEMENT

CROSS-REFERENCES TO RELATED APPLICATIONS

This application claims priority to co-pending U.S. provisional application 61/611,483, filed Mar. 15, 2012, entitled "Reception, Recording, Storage, and Manipulation of Multiple Television Channels", the entire disclosure of which is hereby incorporated by reference for all purposes.

BACKGROUND

The advent of the digital video recorder (DVR) and the availability of high-capacity computer-readable storage devices at reasonable prices have made available many possibilities to television programming service providers and television viewers alike. In recent years, television viewers have come to expect the ability to easily customize and manage the recording of television programming via their television receivers.

SUMMARY

In some embodiments, a system for managing television programming storage is presented. The system may include one or more processors. The system may include a memory communicatively coupled with and readable by the one or more processors and having stored therein processor-readable instructions. When executed by the one or more processors, the instructions may cause the one or more processors to receive user input specifying a number of days for retention of each managed array of a plurality of managed arrays of television channels to be recorded by a television receiver. A television service provider may select a plurality of television channels for recording within the plurality of managed arrays of television channels. The television service provider may define times for recording of the plurality of television channels of the plurality of managed arrays of television channels. The instructions may cause the one or more processors to calculate a first amount of storage space for storage of the plurality of managed arrays of television channels based on the number of days for retention. The instructions may cause the one or more processors to allocate the first amount of storage space of a storage medium to the plurality of managed arrays of television channels.

Embodiments of such a system may include one or more of the following: The instructions may cause the one or more processors to determine the first amount of storage space for the plurality of managed arrays of television channels exceeds available space of the storage medium. The instructions may cause the one or more processors to, in response to determining the first amount of storage space for the plurality of managed arrays of television channels exceeds available space of the storage medium, select a television program stored by the storage medium. The television program may be recorded by the television received based on a user-defined timer. The television program may be selected based on the television channel having an older date of recording than other television programs stored by the storage medium. The instructions may be configured to cause the one or more processors to delete the selected television program. The television program may not be protected, wherein protection is specified by user-input to the television receiver. At least a second television program stored by the storage medium may be recorded by the television received based on a second user-defined timer. The second television program may have an oldest date of recording compared to all television programs stored by the television received recorded based on user-defined timers. The second television program may be protected.

Additionally or alternatively, embodiments of such a system may include one or more of the following: The instructions may be configured to cause the one or more processors to allocate a second amount of storage space of the storage medium to on-demand programming storage. A portion of storage space of the storage medium remaining following allocation of the first amount of storage space and the second amount of storage space may be used for storage of television programs recorded based on user-defined timers. The instructions may be configured to cause the one or more processors to receive user input specifying an undesired television channel to not be recorded as part of the plurality of managed arrays of television channels to be recorded by the television receiver. The instructions may be configured to cause the one or more processors to recalculate the first amount of storage space for storage of the plurality of managed arrays of television channels without the undesired television channel. The instructions may be configured to cause the one or more processors to allocate a third amount of storage space of the storage medium to the plurality of managed arrays of television channels without the undesired television channel. The third amount of storage space of the storage medium may be allocated instead of the first amount of storage space of the storage medium. The third amount of storage space of the storage medium may be less than the first amount of storage space of the storage medium. The instructions may be configured to cause the one or more processors to receive user input indicating rerun television programming is not to be stored by the television receiver. The instructions may be configured to cause the one or more processors to determine if each television program within a managed array of television channels is a rerun based on an original broadcast date indicated in electronic programming guide information. The instructions may be configured to cause the one or more processors to in response to determining a television program within the managed array of television channels is the rerun, cause the television program to not be stored.

In some embodiments, a method for managing television programming storage at a television receiver is presented. The method may include receiving user input specifying a number of days for retention of each managed array of a plurality of managed arrays of television channels to be recorded by the television receiver. A television service provider may select a plurality of television channels for recording as the plurality of managed arrays of television channels. The television service provider may define times for recording of the plurality of television channels of the plurality of managed arrays of television channels. The method may include calculating a first amount of storage space for storage of the plurality of managed arrays of television channels based on the number of days for retention. The method may include allocating the first amount of storage space of a storage medium to the plurality of managed arrays of television channels.

Embodiments of such a method may include one or more of the following: The method may include determining the first amount of storage space for the plurality of managed arrays of television channels exceeds available space of the storage medium. The method may include, in response to determining the first amount of storage space for the plurality of managed arrays of television channels exceeds available space of the storage medium, selecting a television program stored by the storage medium. The television program may be recorded by the television received based on a user-defined timer. The television program may be selected based on the television channel having an older date of recording than other television programs stored by the storage medium. The method may include deleting the selected television program. The television program may not be protected, wherein protection is specified by user-input to the television receiver. At least a second television program stored by the storage medium may have been recorded by the television received based on a second user-defined timer. The second television program may have an oldest date of recording compared to all television programs stored by the television received recorded based on user-defined timers. The second television program may be protected. The method may include allocating a second amount of storage space of the storage medium to on-demand programming storage. A portion of storage space of the storage medium remaining following allocation of the first amount of storage space and the second amount of storage space may be used for storage of television programs recorded based on user-defined timers. The method may include receiving, from a user, selection of a subset of television channels to record from the plurality of television channels, wherein the calculating comprises calculating the first amount of storage space for storage of the plurality of managed arrays of television channels based on the number of days for retention and a number of television channels in the subset of television channels.

In some embodiments, a non-transitory processor-readable medium for managing television programming storage. The non-transitory processor-readable medium may comprise processor-readable instructions configured to cause one or more processors to receive user input specifying a number of days for retention of each managed array of a plurality of managed arrays of television channels to be recorded by a television receiver. A television service provider may select a plurality of television channels for recording within the plurality of managed arrays of television channels. The television service provider may define times for recording of the plurality of television channels of the plurality of managed arrays of television channels. The instructions may cause the one or more processors to calculate a first amount of storage space for storage of the plurality of managed arrays of television channels based on the number of days for retention. The instructions may cause the one or more processors to allocate the first amount of storage space of a storage medium to the plurality of managed arrays of television channels.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
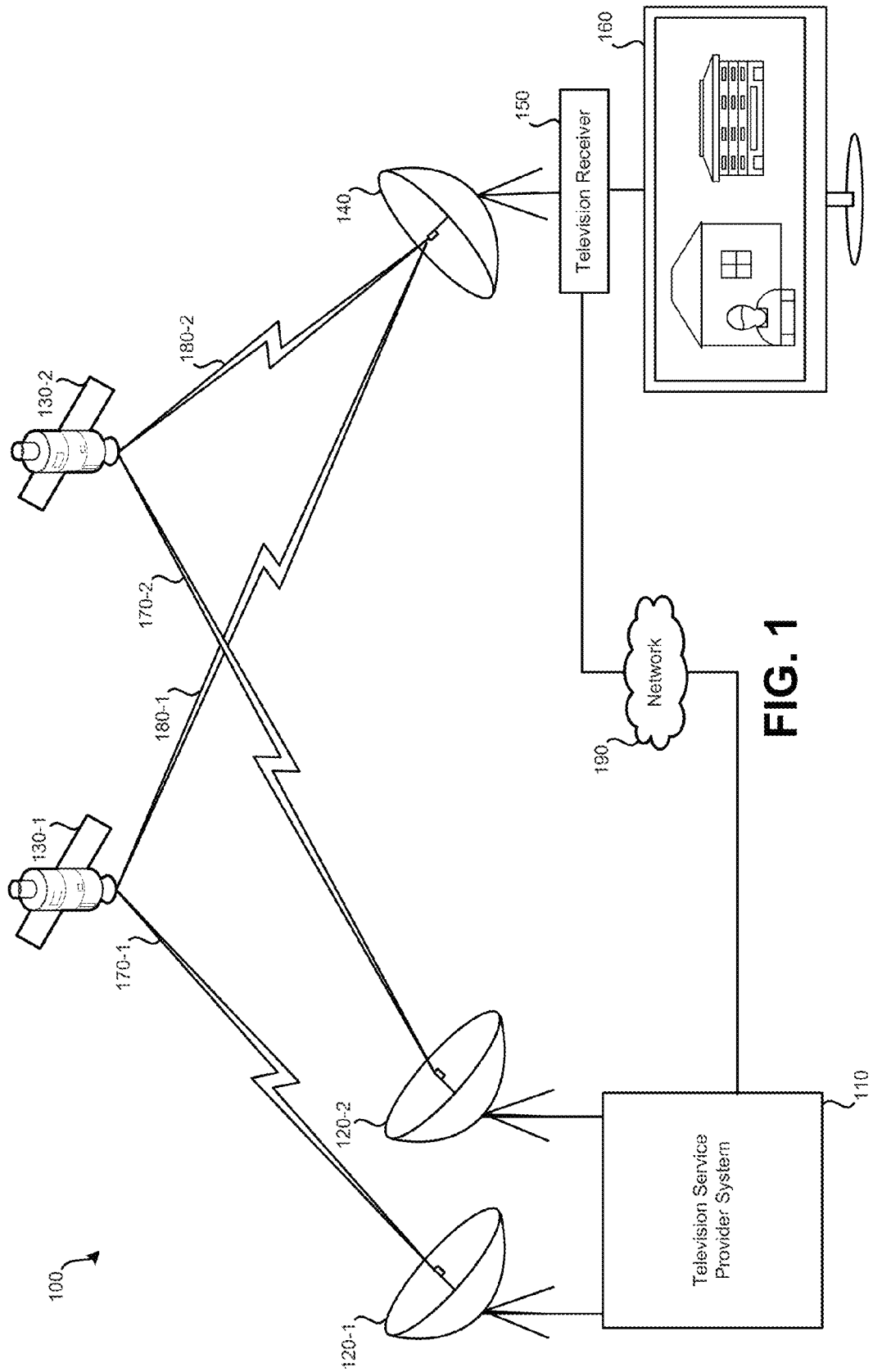
FIG. 1 illustrates an embodiment of a satellite television distribution system.

A television viewer, referred to as a user, may be able to use a television receiver, which may include digital video recorder (DVR) functionality, to record and view television programming in multiple ways. First, a user may be permitted to define timers to record specific television programs selected by the user. As such, each user-defined timer may record a specific television program selected by a user. A user-defined timer may specify a time period, date, and channel for which recording is to occur. At the defined time period and date, the television channel may be recorded and stored by the television receiver. The television program to be recorded may be selected via an electronic programming guide (EPG) of the television receiver.

While timers may be user-defined, other television programming may be recorded based on one or more timers defined by a television service provider. The service provider may transmit data to the television receiver (possibly via satellite) that indicates one or more times, dates, and television channels to be recorded. For example, a television service provider may configure a television receiver to record each major television network each day of the week during primetime. A more specific example may include ABC, CBS, NBC, and FOX being recorded daily from 6-10 PM. A user may have the ability to enable or disable recording of arrays of television channels; however, the specifics of the timers, such as which television channels and which times, may be managed by the television service provider.

Additionally, a television receiver may store on-demand content. On-demand content is not recorded from broadcast television channels using timers by television receivers. Rather, on-demand content is content provided to the television receiver directly for storage by the television receiver and for later presentation to a user. On-demand content is not recorded by a television receiver using a timer. In some systems, on-demand content is requested by a television receiver and retrieved from a remote server in response to a user requesting the on-demand content. In other systems, such as systems in which bandwidth is at a premium and/or communication to the television receiver is one-way (e.g., via satellite), on-demand content may be pre-loaded to a television receiver for the possibility of a user requesting the on-demand content. On-demand content may be "free" (e.g., included in the cost of a user's subscription with the television service provider) or may be pay-per-view (e.g., a movie that costs an amount of money to be viewed).

Still further, storage space at the television receiver may be used to store information necessary for the television receiver to properly access and decode television channels requested for viewing and/or recording. Information related to an electronic programming guide (EPG) may be stored by the television receiver. Such information may include television channel and program scheduling information, program descriptions, original broadcast date information, ratings information, etc.

As can be seen from the above examples, storage space at a television receiver may be subject to multiple—possibly competing—demands. While, ideally, an unlimited amount of storage space may be available at a television receiver, the storage space available at the television receiver is finite and must be managed. Embodiments detailed herein describe various arrangements for managing storage space at a television receiver.

In some embodiments, depending on user preferences, the amount of storage space allocated for storage of service provider managed arrays is adjusted. As described herein, a service provider managed array comprises channel-specific files, each of which may contain multiple television programs. For instance, a user may define a number of days for which television programs recorded as part of service provider managed arrays are to be retained. While the television service provider may define a set of television channels which are eligible for recording as the array of television channels, a user may specify only a subset of the set are to be recorded as the array of television channels. As such, a user may be able to cause one or more undesired television channels to not be recorded as part of the service provider-defined arrays of television channels. A user may also indicate a preference as to whether "reruns" (television programs being broadcast on television for at least a second time) are recorded within the service provider managed arrays or not.

Depending on the user's preferences, the amount of space allocated for storage of service provider managed arrays and for storage of television programming recorded via user-defined timers may vary. When a conflict arises, television programming recorded via user-defined timers may be deleted to make sufficient room for the service provider managed arrays. For instance, if insufficient space is available for service provider managed arrays, an oldest television program recorded based on a user-timer may be deleted to free additional storage space. This oldest television program may only be deleted if it is "unprotected." A user may be able to define if a television program recorded via a user timer is protected or not. If protected, the next oldest television program recorded using a user-timer may be deleted instead (and so on, if this television program is also protected).

FIG. 1 illustrates an embodiment of a satellite television distribution system 100. While embodiments detailed herein may be applied to various television distribution systems, including cable and IP, a satellite television distribution system is provided as an example. Satellite television distribution system 100 may include: television service provider system 110, satellite transmitter equipment 120, satellites 130, satellite dish 140, television receiver 150, and display device 160. Alternate embodiments of satellite television distribution system 100 may include fewer or greater numbers of components. While only one satellite dish 140, television receiver 150, and display device 160 (collectively referred to as "user equipment") are illustrated, it should be understood that multiple (e.g., tens, thousands, millions) instances of user equipment may receive television signals from satellites 130.

Television service provider system 110 and satellite transmitter equipment 120 may be operated by a television service provider. A television service provider may distribute television channels, on-demand programming, programming information, and/or other services to users. Television service provider system 110 may receive feeds of one or more television channels from various sources. Such television channels may include multiple television channels that contain the same content (but may be in different formats, such as high-definition and standard-definition). To distribute such television channels to users, feeds of the television channels may be relayed to user equipment via one or more satellites via transponder streams. Satellite transmitter equipment 120 may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically to communicate with satellites 130. Such multiple instances of satellite transmitting equipment may communicate with the same or with different satellites. Different television channels may be transmitted to satellites 130 from different instances of transmitting equipment. For instance, a different satellite dish of satellite transmitter equipment 120 may be used for communication with satellites in different orbital slots.

Satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from transponder stream 180. Satellites 130 may be in geosynchronous orbit. Each satellite 130 may be in a different orbital slot, such that the signal paths between each satellite, transmitter equipment, and user equipment vary. Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be carried on a first transponder of satellite 130-1. A third, fourth, and fifth television channel may be carried using a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 140 may be a piece of user equipment that is used to receive transponder streams from one or more satellites, such as satellites 130. Satellite dish 140 may be provided to a user for use on a subscription basis to receive television channels provided by the television service provider system 110, satellite transmitter equipment 120, and/or satellites 130. Satellite dish 140 may be configured to receive transponder streams from multiple satellites and/or multiple transponders of the same satellite. Satellite dish 140 may be configured to receive television channels via transponder streams on multiple frequencies. Based on the characteristics of television receiver 150 and/or satellite dish 140, it may only be possible to capture transponder streams from a limited number of transponders concurrently. For example, a tuner of television receiver 150 may only be able to tune to a single transponder stream from a transponder of a single satellite at a time.

Figure 2:
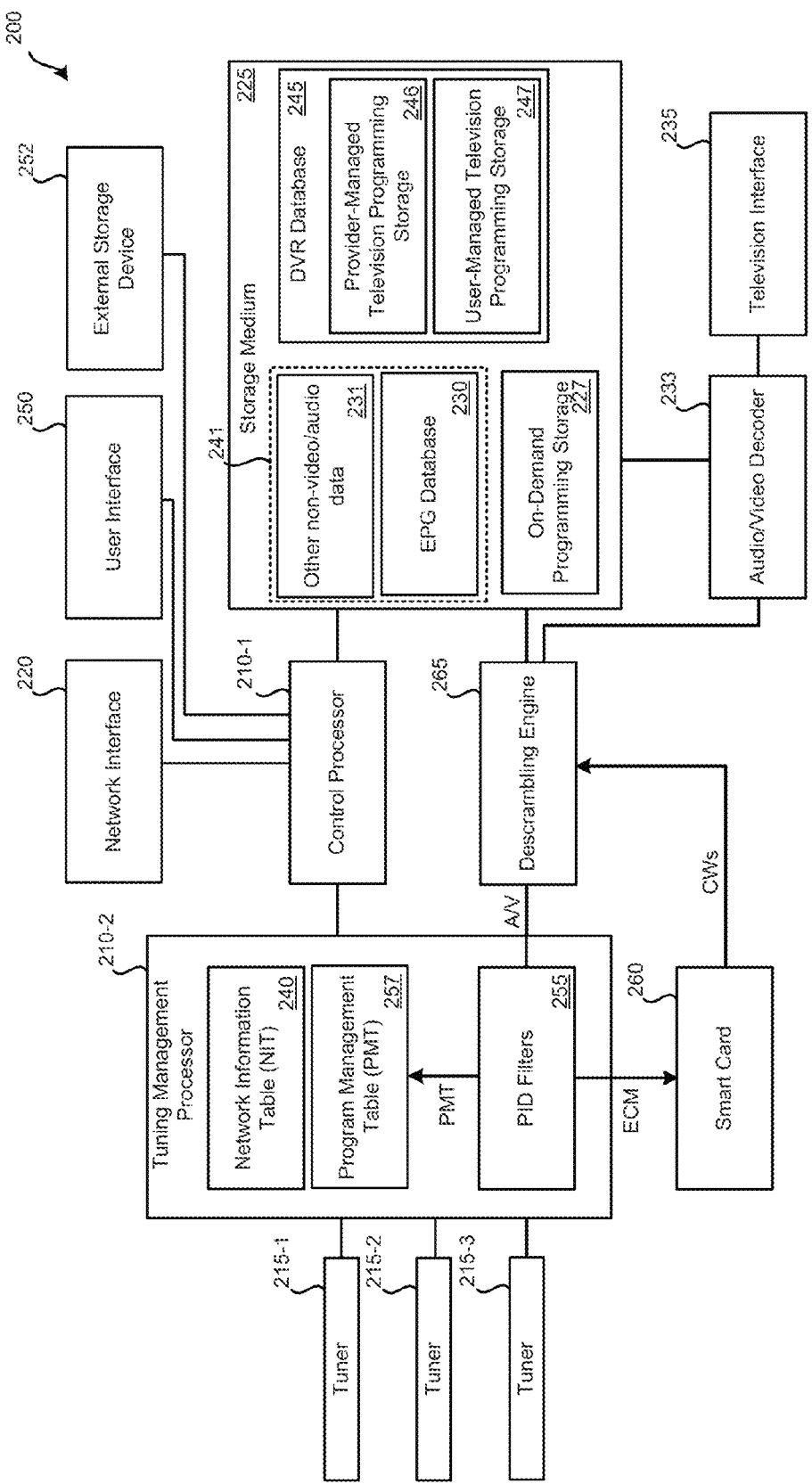
FIG. 2 illustrates an embodiment of a television receiver that is configured to manage storage space.

In communication with satellite dish 140 may be one or more sets of receiving equipment. Receiving equipment may be configured to decode signals received from satellites 130 via satellite dish 140 for display on a display device, such as display device 160. Receiving equipment may be incorporated as part of a television or may be part of a separate device, commonly referred to as a set-top box (STB). Receiving equipment may include a satellite tuner configured to receive television channels via a satellite. In FIG. 1, receiving equipment is present in the form of television receiver 150. As such, television receiver 150 may decode signals received via satellite dish 140 and provide an output to display device 160. FIG. 2 provides additional detail of a television receiver. A television receiver is defined to include set-top boxes (STBs) and also circuitry having similar functionality that may be incorporated with another device. For instance, circuitry similar to that of a television receiver may be incorporated into a television. As such, while FIG. 1 illustrates an embodiment of television receiver 150 as separate from display device 160, it should be understood that in other embodiments, similar functions may be performed by a television receiver integrated with display device 160.

Display device 160 may be used to present video and/or audio decoded by television receiver 150. Television receiver 150 may also output a display of one or more interfaces to display device 160, such as an electronic programming guide (EPG). In some embodiments, a display device other than a television may be used. Display device 160 may be a television, monitor, or some other device configured to display video and, possibly, play audio.

Uplink signal 170-1 represents a signal between satellite transmitter equipment 120 and satellite 130-1. Uplink signal 170-2 represents a signal between satellite transmitter equipment 120 and satellite 130-2. Each of uplink signals 170 may contain streams of one or more different television channels. For example, uplink signal 170-1 may contain a certain group of television channels, while uplink signal 170-2 contains a different grouping of television channels. Each of these television channels may be scrambled such that unauthorized persons are prevented from accessing the television channels.

Transponder stream 180-1 represents a signal between satellite 130-1 and satellite dish 140. Transponder stream 180-2 represents a signal path between satellite 130-2 and satellite dish 140. Each of transponder streams 180 may contain one or more different television channels in the form of transponder streams, which may be at least partially scrambled. For example, transponder stream 180-1 may include a first transponder stream containing a first group of television channels, while transponder stream 180-2 may include a second transponder stream containing a different group of television channels. A satellite may transmit multiple transponder streams to user equipment. For example, a typical satellite may relay thirty-two transponder streams via corresponding transponders to user equipment. Further, spot beams are possible. For example, a satellite may be able to transmit a transponder stream to a particular geographic region (e.g., to distribute local television channels to the relevant market). Different television channels may be transmitted using the same frequency of the transponder stream to a different geographic region.

FIG. 1 illustrates transponder stream 180-1 and transponder stream 180-2 being received by satellite dish 140. For a first group of television channels, satellite dish 140 may receive a transponder stream of transponder stream 180-1; for a second group of channels, a transponder stream of transponder stream 180-2 may be received. Television receiver 150 may decode the received transponder stream. As such, depending on which television channel(s) are desired, a transponder stream from a different satellite (or a different transponder of the same satellite) may be accessed and decoded by television receiver 150. Further, while two satellites are present in satellite television distribution system 100, in other embodiments greater or fewer numbers of satellites may be present for receiving and transmitting transponder streams to user equipment.

Network 190 may serve as a secondary communication channel between television service provider system 110 and television receiver 150. Via such a secondary communication channel, bidirectional exchange of data may occur. As such, data may be transmitted to television service provider system 110 via network 190. Data may also be transmitted from television service provider system 110 to television receiver 150 via network 190. Network 190 may be the Internet. While audio and video services may be provided to television receiver 150 via satellites 130, feedback from television receiver 150 to television service provider system 110 may be transmitted via network 190.

FIG. 1 illustrates an example of a satellite-based television channel distribution system. It should be understood that at least some of the aspects of such a system may be similar to a cable television distribution system. For example, in a cable television system, rather than using satellite transponders, multiple RF channels on a cable may be used to transmit streams of television channels. As such, aspects detailed herein may be applicable to cable television distribution systems.

FIG. 2 illustrates an embodiment of television receiver 200, which may typically be in the form of a separate device configured to be connected with a presentation device, such as a television. Embodiments of television receiver 200 may include set top boxes (STBs). As previously noted, in addition to being in the form of an STB, a television receiver may be incorporated into another device, such as a television. For example, a television may have an integrated television receiver (which does not involve an external STB being coupled with the television). An STB may contain some or all of the components of television receiver 200 and/or may be able to perform some or all of the functions of television receiver 200. Accordingly, instances in this document referring to an STB and steps being performed by an STB may also be performed, more generally, by a television receiver.

FIG. 2 illustrates a block diagram of an embodiment of television receiver 200 that is configured to record omnibus channel files and extract a television program from a recorded omnibus channel file. Television receiver 200 may be the television receiver of FIG. 1 and may be in the form of an STB that communicates with a display device such as a television. Television receiver 200 may be incorporated as part of a television, such as display device 160 of FIG. 1. Television receiver 200 may include: processors 210 (which may include control processor 210-1 and tuning management processor 210-2), tuners 215, network interface 220, non-transitory computer-readable storage medium 225, electronic programming guide (EPG) database 230, television interface 235, networking information table (NIT) 240, digital video recorder (DVR) database 245 (which may include provider-managed television programming storage 246 and/or user-defined television programming 247), on-demand programming 227, user interface 250, external storage device 252, PID filters 255, smart card 260, and/or descrambling engine 265. In other embodiments of television receiver 200, fewer or greater numbers of components may be present. It should be understood that the various components of television receiver 200 may be implemented using hardware, firmware, software, and/or some combination thereof. Functionality of components may be combined; for example, functions of descrambling engine 265 may be performed by tuning management processor 210-2. Further, functionality of components may be spread among additional components; for example, PID filters 255 may be handled by separate hardware from program management table 257.

Processors 210 may include one or more specialized and/or general-purpose processors configured to perform processes such as tuning to a particular channel, accessing and displaying EPG information from EPG database 230, and/or receiving and processing input from a user. For example, processors 210 may include one or more processors dedicated to decoding video signals from a particular format, such as MPEG, for output and display on a television and for performing decryption. It should be understood that the functions performed by various modules of FIG. 2 may be performed using one or more processors. As such, for example, functions of descrambling engine 265 may be performed by control processor 210-1.

Control processor 210-1 may communicate with tuning management processor 210-2. Control processor 210-1 may control the recording of television channels based on timers stored in DVR database 245. Control processor 210-1 may initiate recording of a television channel by sending a record command along with an indication of the television channel to be recorded to tuning management processor 210-2. Control processor 210-1 may not send a second record command (if additional recording is to begin at the same time) until an acknowledgement that recording of the first television channel has successfully been received and initiated by tuning management processor 210-2. Control processor 210-1 may also provide commands to tuning management processor 210-2 when recording of a television channel is to cease. In addition to providing commands relating to the recording of television channels, control processor 210-1 may provide commands to tuning management processor 210-2 that indicate television channels to be output to audio/video decoder 233 for output to a presentation device, such as a television.

Control processor 210-1 may also communicate with network interface 220 and user interface 250. Control processor 210-1 may handle incoming data from network interface 220 and user interface 250. Additionally, control processor 210-1 may be configured to output data via network interface 220.

Tuners 215 may include one or more tuners used to tune to television channels, such as television channels transmitted via satellite or cable. In the illustrated embodiment of television receiver 200, three tuners are present (tuner 215-1, tuner 215-2, and tuner 215-3). Each tuner contained in tuners 215 may be capable of receiving and processing a single stream of data from a satellite transponder (or a cable RF channel) at a given time. As such, a single tuner may tune to a single transponder (or, for a cable network, a single cable RF channel). If tuners 215 include multiple tuners, one tuner may be used to tune to a television channel on a first transponder stream for display using a television, while another tuner may be used to tune to a television channel on a second transponder for recording and viewing at some other time. Still another tuner may be used to check various television channels to determine if they are available or not. If multiple television channels transmitted on the same transponder stream are desired, a single tuner of tuners 215 may be used to receive the signal containing the multiple television channels for presentation and/or recording. Tuners 215 may receive commands from tuning management processor 210-2. Such commands may instruct tuners 215 which frequencies are to be used for tuning.

Network interface 220 may be used to communicate via an alternate communication channel with a television service provider. For example, the primary communication channel may be via satellite (which may be unidirectional to the STB) and the alternate communication channel (which may be bidirectional) may be via a network, such as the Internet. Referring back to FIG. 1, television receiver 150 may be able to communicate with television service provider system 110 via a network, such as the Internet. This communication may be bidirectional: data may be transmitted from television receiver 150 to television service provider system 110 and from television service provider system 110 to television receiver 150. Referring back to FIG. 2, network interface 220 may be configured to communicate via one or more networks, such as the Internet, to communicate with television service provider system 110 of FIG. 1. Information may be transmitted and/or received via network interface 220.

Storage medium 225 may represent a non-transitory computer-readable storage medium. Storage medium 225 may include memory and/or a hard drive. Storage medium 225 may be used to store information received from one or more satellites and/or information received via network interface 220. Storage medium 225 may store information related to EPG database 230, other non-video/audio data 231, DVR database 245, and/or on-demand programming 227. Recorded television programs may be stored using storage medium 225 as part of DVR database 245. Storage medium 225 may be partitioned or otherwise divided (such as into folders) such that predefined amounts of storage medium 225 are devoted to storage of television programs recorded due to user-defined timers and stored of television programs recorded due to provider-defined timers.

EPG database 230 may store information related to television channels and the timing of programs appearing on such television channels. EPG database 230 may be stored using storage medium 225, which may be a hard drive. Information from EPG database 230 may be used to inform users of what television channels or programs are popular and/or provide recommendations to the user. Information from EPG database 230 may provide the user with a visual interface displayed by a television that allows a user to browse and select television channels and/or television programs for viewing and/or recording. Information used to populate EPG database 230 may be received via network interface 220 and/or via satellites, such as satellites 130 of FIG. 1 via tuners 215. For instance, updates to EPG database 230 may be received periodically via satellite. EPG database 230 may serve as an interface for a user to control DVR functions of television receiver 200, and/or to enable viewing and/or recording of multiple television channels simultaneously.

In addition to being used to provide users with information about scheduled programming, information from EPG database 230 may be used to determine when television programs begin and end for the purposes of recording. For instance, if a channel-specific file is recorded that contains multiple television programs, the start and end of time of specific television programs within the channel-specific file may be based on the start and end times indicated in the EPG. Other data may be stored for the EPG that may be useful in managing channel-specific files, such as series identifiers and episode identifiers (which may be used by a television service provider to identify particular television programs).

The network information table (NIT) 240 may store information used by television receiver 200 to access various television channels. NIT 240 may be stored locally by a processor, such as tuning management processor 210-2 and/or by storage medium 225. Information used to populate NIT 240 may be received via satellite (or cable) through tuners 215 and/or may be received via network interface 220 from the television service provider. As such, information present in NIT 240 may be periodically updated. In some embodiments, NIT 240 may be locally-stored by television receiver 200 using storage medium 225. Generally, NIT 240 may store information about a service provider network, such as a satellite-based service provider network. Information that may be present in NIT 240 may include: television channel numbers, satellite identifiers, frequency identifiers and/or transponder identifiers for various television channels. In some embodiments, NIT 240 may contain additional data or additional tables may be stored by the television receiver. For example, specific audio PIDs and video PIDs may not be present in NIT 240, a channel identifier may be present within NIT 240 which may be used to look up the audio PIDs and video PIDs in another table, such as a program map table (PMT). In some embodiments, a PID associated with the data for the PMT is indicated in a separate table, program association table (PAT), which is not illustrated in FIG. 2. A PAT may be stored by the television receiver in a similar manner to the NIT. For example, a PMT may store information on audio PIDs, and/or video PIDs. A PMT store data on ECM (entitlement control message) PIDs for television channels that are transmitted on a transponder frequency.

Table 1 provides a simplified example of NIT 240 for several television channels. It should be understood that in other embodiments, many more television channels may be represented in NIT 240. NIT 240 may be periodically updated by a television service provider. As such, television channels may be reassigned to different satellites and/or transponders, and television receiver 200 may be able to handle this reassignment as long as NIT 240 is updated.

TABLE 1

| Channel | Satellite | Transponder |
|---|---|---|
| 4 | 1 | 2 |
| 5 | 2 | 11 |
| 7 | 2 | 3 |
| 13 | 2 | 4 |

Based on information in the NIT, it may be possible to determine the proper satellite and transponder to which to tune for a particular television channel. In some embodiments, the NIT may list a particular frequency to which to tune for a particular television channel. Once tuned to the proper satellite/transponder/frequency, the PMT PID may be used to retrieve a program management table that indicates the PIDs for audio and video streams of television channels transmitted by that transponder.

It should be understood that the values provided in Table 1 are for example purposes only. Actual values, including how satellites and transponders are identified, may vary. Additional information may also be stored in NIT 240. Additional information on how NIT 240, as indicated in Table 1, may be used is provided in reference to FIG. 3.

While a large portion of storage space of storage medium 225 is devoted to storage of television programming, a portion 241 may be devoted to storage of non-audio/video data, such as EPG database 230 and other non-video/audio data 231. This "other" data may permit television receiver 200 to function properly. In some embodiments, at least ten gigabytes are allocated to such other data. For example, if NIT 240 is stored by storage medium 225, it may be part of other non-video/audio data 231.

Audio/video decoder 233 may serve to convert encoded video and audio into a format suitable for output to a display device. For instance, audio/video decoder 233 may receive MPEG video and audio from storage medium 225 or descrambling engine 265 to be output to a television. MPEG video and audio from storage medium 224 may have been recorded to DVR database 245 as part of a previously-recorded television program. Audio/video decoder 233 may convert the MPEG video and audio into a format appropriate to be displayed by a television or other form of display device and audio into a format appropriate to be output from speakers, respectively.

Television interface 235 may serve to output a signal to a television (or another form of display device) in a proper format for display of video and playback of audio. As such, television interface 235 may output one or more television channels, stored television programming from storage medium 225 (e.g., television programs from DVR database 245, television programs from on-demand programming 227 and/or information from EPG database 230) to a television for presentation.

Digital Video Recorder (DVR) functionality may permit a television channel to be recorded for a period of time. DVR functionality of television receiver 200 may be managed by control processor 210-1. Control processor 210-1 may coordinate the television channel, start time, and stop time of when recording of a television channel is to occur. DVR database 245 may store information related to the recording of television channels. DVR database 245 may store timers that are used by control processor 210-1 to determine when a television channel should be tuned to and its programs recorded to DVR database 245 of storage medium 225. In some embodiments, a limited amount of storage medium 225 may be devoted to DVR database 245. Timers may be set by the television service provider and/or one or more users of television receiver 200.

The DVR functionality of control processor 210-1 may have multiple modes. First, the DVR functionality of control processor 210-1 may be configured to record individual television programs selected by a user to user-defined television programming 247. Such user-defined television programming 247 may be recorded based on user-defined timers. Each user-defined timer is set by a user and specifies a date, television channel, and a time period for recording. User-defined television programming 247, in addition to including audio and video data for the television program, may include data about the recording, such as a time and/or date of when the television program was recorded, whether the television program has been designated as protected, and EPG information. To create a user-defined timer, a user may select a particular television program via a graphically-displayed EPG. Based on the date, time period, and television channel indicated by EPG database 230, Control processor 210-1 may record the associated television program to user-managed television programming storage 247 of DVR database 245. In some embodiments, a series identifier and episode identifier may be used to schedule a timer to record the broadcast of a television program.

DVR database 245 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to television receiver 200 via the television provider's network. For example, referring to system 100 of FIG. 1, in a satellite-based television service provider system, data necessary to create the provider-defined timers at television receiver 150 may be received via satellite.

As an example of DVR functionality of television receiver 200 being used to record based on provider-defined timers, a television service provider may configure television receiver 200 to record television programming on multiple, predefined television channels for a predefined period of time, on predefined dates. For instance, a television service provider may configure television receiver 200 such that television programming may be recorded from 7 to 10 PM on NBC, ABC, CBS, and FOX on each weeknight and from 6 to 10 PM on each weekend night on the same channels. If a television program is selected for recording by a user and is also specified for recording by the television service provider, the user selection may serve as an indication to save the television program for an extended time (beyond the time which the predefined recording would otherwise be saved). Television programming recorded based on provider-defined timers may be stored to provider-managed television programming storage 246.

Storage space of storage medium 225 may be allocated among provider-managed television programming storage 246 and user-managed television programming storage 247. For instance, space that is allocated to provider-managed television programming storage 246 may be reallocated to user-managed television programming storage 247; the reverse may also be possible. Reallocation may occur based on user-preferences and/or service provider propagated settings.

On-demand programming 227 may represent additional television programming stored by storage medium 225. On-demand programming 227 may include television programming that was not recorded to storage medium 225 via a timer (either user- or provider-defined). Rather, on-demand programming is programming provided to the television receiver directly for storage by the television receiver and for later presentation to one or more users. In some systems, such as cable and IP-based television distribution networks, on-demand content is requested by a television receiver and retrieved from a remote server in response to a user requesting the on-demand content. In other systems, such as systems in which bandwidth is at a premium and/or communication to the television receiver is one-way (e.g., satellite-based television distribution networks), on-demand content may be pre-loaded to a television receiver for the possibility of a user requesting the on-demand content. On-demand content may be "free" (e.g., included in the cost of a user's subscription with the television service provider) or may be pay-per-view (e.g., a movie that costs an amount of money to be viewed). On-demand programming 227 may not be user-selected. As such, the television programming stored to on-demand programming storage 227 may be the same for each television receiver of a television service provider. In some embodiments, programming stored to on-demand programming storage 227 may be standardized based on a manufacturer and/or model of television receiver (e.g., television receivers of the same make and/or model store the same on-demand programming). What on-demand programming and for how long such on-demand programming is retained by the television receiver may be determined based on settings propagated by the television service provider.

Storage space of storage medium 225 may also be allocated among provider-managed television programming storage 246, user-managed television programming storage 247, and on-demand programming storage 227. For instance, space may be allocated among provider-managed television programming storage 246, user-managed television programming storage 247, and/or on-demand programming storage 227. Reallocation may occur based on user-preferences and/or service provider propagated settings.

User interface 250 may include a remote control (physically separate from television receiver 200) and/or one or more buttons on television receiver 200 that allow a user to interact with television receiver 200. User interface 250 may be used to select a television channel for viewing, view information from EPG database 230, and/or program a timer stored to DVR database 245, wherein the timer is used to control the DVR functionality of control processor 210-1.

Referring back to tuners 215, television channels received via satellite (or cable) may contain at least some scrambled data. Packets of audio and video may be scrambled to prevent unauthorized users (e.g., nonsubscribers) from receiving television programming without paying the television service provider. When a tuner of tuners 215 is receiving data from a particular transponder of a satellite, the transponder stream may be a series of data packets corresponding to multiple television channels. Each data packet may contain a packet identifier (PID), which, in combination with NIT 240 and/or PMT 257, can be determined to be associated with particular television channel. Particular data packets, referred to as entitlement control messages (ECMs) may be periodically transmitted. ECMs may be associated with another PID and may be encrypted; television receiver 200 may use smart card 260 to decrypt ECMs. Decryption of an ECM may only be possible if the user has authorization to access the particular television channel associated with the ECM. When an ECM is determined to correspond to a television channel being stored and/or displayed, the ECM may be provided to smart card 260 for decryption.

When smart card 260 receives an encrypted ECM, smart card 260 may decrypt the ECM to obtain some number of control words. In some embodiments, from each ECM received by smart card 260, two control words are obtained. In some embodiments, when smart card 260 receives an ECM, it compares the ECM to the previously received ECM. If the two ECMs match, the second ECM is not decrypted because the same control words would be obtained. In other embodiments, each ECM received by smart card 260 is decrypted; however, if a second ECM matches a first ECM, the outputted control words will match; thus, effectively, the second ECM does not affect the control words output by smart card 260. Smart card 260 may be permanently part of television receiver 200 or may be configured to be inserted and removed from television receiver 200.

Tuning management processor 210-2 may be in communication with tuners 215 and control processor 210-1. Tuning management processor 210-2 may be configured to receive commands from control processor 210-1. Such commands may indicate when to start/stop recording a television channel and/or when to start/stop causing a television channel to be output to a television. Tuning management processor 210-2 may control tuners 215. Tuning management processor 210-2 may provide commands to tuners 215 that instruct the tuners which satellite, transponder, and/or frequency to tune to. From tuners 215, tuning management processor 210-2 may receive transponder streams of packetized data. As previously detailed, some or all of these packets may include a PID that identifies the content of the packet.

Tuning management processor 210-2 may be configured to create one or more PID filters 255 that sort packets received from tuners 215 based on the PIDs. When a tuner is initially tuned to a particular frequency (e.g., to a particular transponder of a satellite) a PID filter may be created based on the PMT data. The PID created based on the PMT data packets may be known because it is stored as part of NIT 240 or another table, such as a program association table (PAT). From the PMT data packets, PMT may be constructed by tuning management processor 210-2. Table 2 provides an exemplary extract of a PMT. PMT 257 may be specific to a television channel on a transponder. As such, if tuning to a different television channel or transponder occurs, a new PMT may be created for the different transponder.

TABLE 2

| Channel | Video PID | 1st Audio PID | 2nd Audio PID |
|---|---|---|---|
| 4 | 1003 | 2383 | 2119 |
| 5 | 2993 | 2727 | 2728 |
| 7 | 9238 | 1233 | 0129 |
| 13 | 0012 | 9348 | — |

Accordingly, based on the information present in PMT 257, the audio and video PIDs for specific television channels may be identified. A television channel may have multiple audio PIDs due to a second audio program (SAP), which may be in a different language.

It should be understood that the values provided in Table 2 are for example purposes only. Actual values may vary. Additional information or less information may also be stored in PMT 257.

PID filters 255 may be configured to filter data packets based on PIDs. In some embodiments, PID filters 255 are created and executed by tuning management processor 210-2. In other embodiments, separate hardware may be used to create and execute such PID filters. Depending on a television channel selected for recording/viewing, a PID filter may be created to filter the video and audio packets associated with the television channel (based on the PID assignments present in PMT 257). For example, if a transponder data stream includes multiple television channels, data packets corresponding to a television channel that is not desired to be stored or displayed by the user may be ignored by PID filters 255. As such, only data packets corresponding to the one or more television channels desired to be stored and/or displayed may be filtered and passed to either descrambling engine 265 or smart card 260; other data packets may be ignored. For each television channel, a stream of video packets, a stream of audio packets (one or both of the audio programs) and/or a stream of ECM packets may be present, each stream identified by a PID. In some embodiments, a common ECM stream may be used for multiple television channels. Additional data packets corresponding to other information, such as updates to NIT 240, may be appropriately routed by PID filters 255. At a given time, one or multiple PID filters may be executed by tuning management processor 210-2.

Descrambling engine 265 may use the control words output by smart card 260 in order to descramble video and/or audio corresponding to television channels for storage and/or presentation. Video and/or audio data contained in the transponder data stream received by tuners 215 may be scrambled. Video and/or audio data may be descrambled by descrambling engine 265 using a particular control word. Which control word output by smart card 260 to be used for successful descrambling may be indicated by a scramble control identifier present within the data packet containing the scrambled video or audio. Descrambled video and/or audio may be output by descrambling engine 265 to storage medium 225 for storage (in DVR database 245) and/or to audio/video decoder 233 for output to a television or other presentation equipment via television interface 235.

External storage device 252 may represent an external, detachable computer-readable non-transitory storage device. The storage device may be memory, a hard drive, or some other type of device for storing computer-readable data. The user may be permitted to connect and disconnect external storage device 252 to increase and decrease an amount of storage space available for storing on-demand programming, service provider-managed television programming, and/or user managed television programming. When external storage device 252 is connected to television receiver 200, storage space on storage medium 225 may be reallocated based on additional storage space now being present on external storage device 252. As such, from the viewpoint of a user, additional space may be available for television programming recorded using user-defined timers. If an external storage device 252 is connected to a television receiver 200, external storage device 252 may be used for provider-managed television programming storage 246 with DVR database 245 being dedicated to user-managed television programming storage 247 (the reverse is also possible). As such, external storage device 252 may be used to isolate provider managed television programming from user managed television programming. Alternatively, television programming recorded due to provider-managed timers and user-managed timers may be stored on both DVR database 245 and external storage device 252. In some embodiments, when DVR database 245 becomes full, the recorded television programs may begin being written to external storage device 252. If an external storage device 252 is removed from being connected with television receiver 200, storage space on storage medium 225 may be reallocated to compensate for the loss of storage space. As such, if the total amount of space needed to be dedicated to on-demand programming storage 227 and television programs recorded based on provider-managed timers remains constant, television programming recorded due to user-managed timers may be deleted (or space available to record such programming may be decreased) to make sufficient storage space available on storage medium 225 for on-demand programming storage 227 and provider-managed television programming storage 246.

For simplicity, television receiver 200 of FIG. 2 has been reduced to a block diagram; commonly known parts, such as a power supply, have been omitted. Further, some routing between the various modules of television receiver 200 has been illustrated. Such illustrations are for exemplary purposes only. The state of two modules not being directly or indirectly connected does not indicate the modules cannot communicate. Rather, connections between modules of the television receiver 200 are intended only to indicate possible common data routing. It should be understood that the modules of television receiver 200 may be combined into a fewer number of modules or divided into a greater number of modules. Further, the components of television receiver 200 may be part of another device, such as built into a television. Also, while television receiver 200 may be used to receive, store, and present television channels received via a satellite, it should be understood that similar components may be used to receive, store, and present television channels via a cable network.

Figure 3A:
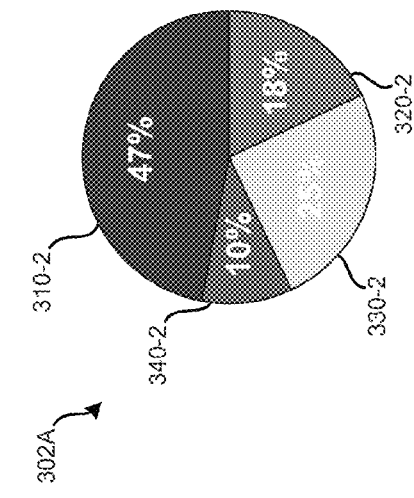
FIGS. 3A and 3B illustrate visual representations of embodiments of the allocation of a storage medium of a television receiver.
Figure 3A:
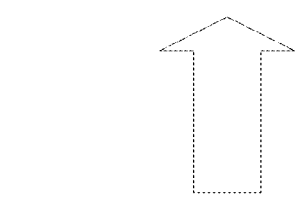
Figure 3A:
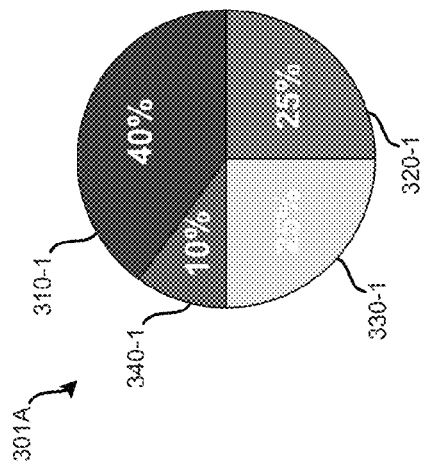
Figure 3A:
Figure 3B:
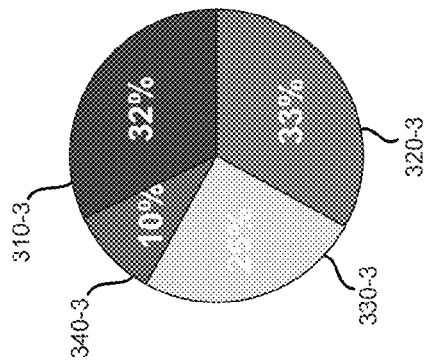
Figure 3B:
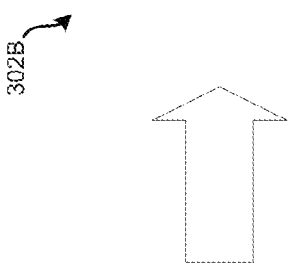
Figure 3B:
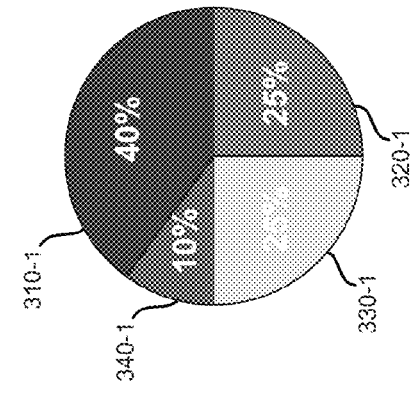
Figure 3B:

FIGS. 3A and 3B illustrate visual representations of embodiments of the allocation of a storage medium of a television receiver. The pie charts of FIGS. 3A and 3B are intended to represent how storage space of storage medium 225 of television receiver 200 of FIG. 2 is allocated and reallocated. While FIGS. 3A and 3B illustrate various percentages of storage space, it should be understood that rather than storage space being allocated based on percentages, specific values may be used to define how much space is allocated to various functions. In these figures, storage space is allocated among: on-demand programming storage, provider managed television programming storage, user-managed television programming storage, and other storage. On-demand programming storage may refer to on-demand programming storage 227 of FIG. 2; provider managed television programming storage may refer to provider-managed television programming storage 246; user-managed television programming storage may refer to user-managed television programming storage 247; and other storage may refer to portion 241 of storage medium 225 which may be used to store data such as EPG data and network information table data. It should be understood that such other storage may also be used to store additional non-audio and non-video data. Further, pie charts of FIGS. 3A and 3B show how storage space is allocated among four categories; it should be understood that in other embodiments storage space may be allocated among 2, 3, 5, or more categories of data.

Referring to embodiment 300A of FIG. 3A, user-managed television programming storage 310-1 refers to television programming stored in response to a user-defined timer. A user-managed television programming storage 310-1 may be adjusted in size based on the amount of space allocated to other purposes. In allocated storage device 301A, 40% of the storage device is allocated to user-managed television programming storage 310-1. As such, the space may be available for a user to record particular television programs that the user may desire to watch a later time.

Provider-managed television programming storage 320-1 may be used to store television programs recorded based on timers defined by a television service provider. The television service provider may cause multiple television channels to be recorded concurrently over a particular period of time during some or all days of the week. Based on the number of days for which television programs recorded according to provider-defined timers are to be retained, the length of time the television channels are recorded, and the number of television channels recorded, the amount of space necessary for storing the television programs associated with the provider-defined timers may vary. The television receiver may be able to calculate at least an approximate amount of space required to store television programming recorded based on provider-defined arrays. Such a characterization may take and affect the number of television channels, the period of time for which each channel is recorded, and the retention time for such recorded television programming. In allocated storage device 301A, 25% of the storage device is allocated to provider-managed television programming storage 320-1. As such, this storage space may be allocated for recording of television channels based on timers defined by the television service provider.

On-demand television programming storage 330-1 may be used to store on-demand television programming. The amount of storage space devoted to on-demand television programming may be set by the television service provider across all television receivers (of a particular make and/or model). In some embodiments, while the amounts of storage allocated to different purposes may shift, the amount of storage devoted to on-demand programming may be kept constant such that the television programming stored at each television receiver matches. Alternatively, in some embodiments, the amount of space allocated to on-demand television programming storage 330-1 may be varied by the television service provider with such space being reallocated to other purposes. In allocated storage device 301A, 25% of the storage device is allocated to on-demand television programming storage 330-1. As such, this storage space may be allocated for storage of television programming that was not recorded by the television receiver from a broadcast of a television channel.

Other information storage 340-1 may be used to store other information for the television receiver. A set amount, such as 10 GB, may be reserved for such other information. In some embodiments, while the amounts of storage allocated to different purposes may shift, the amount of storage devoted to such other information storage 340-1 may be kept constant. In allocated storage device 301A, 10% of the storage device is allocated to other information storage 340-1. As such, this storage space may be allocated for non-audio and video data, such as EPG data and NIT data.

Following an event, the amount or percentages of storage space allocated to different purposes may be reallocated. The event may be based on a user providing user preferences. For example, in reference to embodiment 300A, a user may specify a decreased amount of time for which television programs recorded due to a provider-defined timer are to be retained. Allocated storage device 301A may have space allocated to 320-1 based on a default number of retention days, such as 8. A user may be permitted to increase or decrease the number of days for which such television programs are retained. In embodiment 300A, the user has specified that the amount of time for which television programs recorded based on provider-defined timers is to be decreased. Embodiment 300A may additionally or alternatively indicate a situation in which a user has specified that fewer television channels of a set of television channels eligible for recording using provider-defined timers are to be recorded using such provider-defined timers. In response to either (or both) such user preference being provided, the television receiver may calculate the amount of space necessary for storage of television programs recorded based on provider-defined timers. Since the amount of space necessary will decrease due to retention being for a fewer number of days (and/or a fewer number of television channels being recorded), this additional space may be reallocated to one or more other purposes.

In allocated storage device 302A, the storage space of the storage medium no longer needed for television programs recorded due to provider-defined timers is reallocated to storage for television programs recorded based on user-defined timers. Accordingly, in allocated storage device 302A, provider-managed television programming storage 320-2 is smaller than provider-managed television programming storage 320-1 and user-managed television programming storage 310-2 is larger than user-managed television programming storage 310-1. On-demand storage 330-2 may remain the same size as on-demand storage 330-1; similarly other information storage 340-2 may remain the same size as other information storage 340-1.

Referring to embodiment 300B of FIG. 3B, allocated storage device 301B has a same initial allocation as allocated storage device 301A of FIG. 3A. While in the embodiment of FIG. 3A, an event occurred in which a user decreased a number of days for which television programs recorded due to provider-defined timers are retained, in the embodiment of FIG. 3B, an event occurred in which a user has increased the number of days for which television programs recorded due to provider-defined timers are retained. Additionally or alternatively, a user may have added a television channel (which is already defined as eligible by the television service provider) to be recorded based on the provider-defined timers. In response to either (or both) such user preference being provided, the television receiver may calculate the amount of space necessary for storage of television programs recorded based on provider-defined timers. Since the amount of space necessary will increase due to retention being for a greater number of days (and/or a greater number of television channels being recorded), space may be reallocated from user-defined television 310-1 to storage for television programs recorded based on provider-defined timers.

In allocated storage device 302B, the storage space of the storage medium needed for television programs recorded based on provider-defined timers is obtained from storage for television programs recorded based on user-defined timers. Accordingly, in allocated storage device 302B, provider-managed television programming storage 320-3 is larger than provider-managed television programming storage 320-1 and user-managed television programming storage 310-3 is smaller than user-managed television programming storage 310-1. On-demand storage 330-2 may remain the same size as on-demand storage 330-1; similarly other information storage 340-2 may remain the same size as other information storage 340-1.

Figure 4:
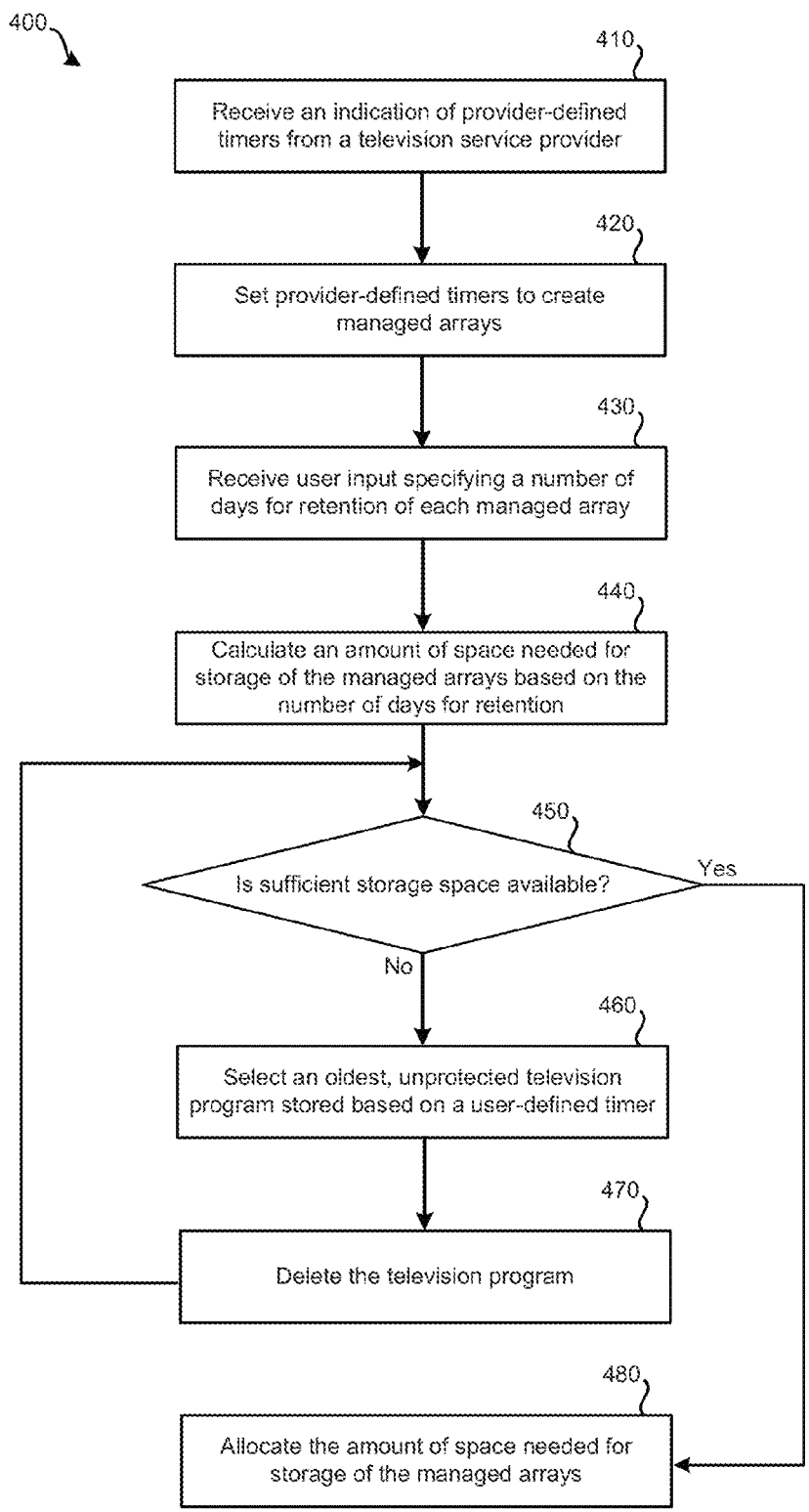
FIG. 4 illustrates an embodiment of a method for managing television programming storage at a television receiver.

Various methods may be performed using the systems previously described. FIG. 4 illustrates an embodiment of a method 400 for managing television programming storage by a television receiver. Method 400 may be performed using the systems and devices previously described. For example, each step of method 400 may be performed using a television receiver, such as television receiver 200 of FIG. 2. It should be understood that other embodiments of television receivers may also be used to perform method 400. Steps of method 400 may be performed using computerized components. As such, the television receiver used to perform method 400 may have some or all of the components described in relation to computer system 800 of FIG. 8. Accordingly, means for performing method 400 include television receivers (which may include any or all of the components described in relation to television receiver 200) and computerized devices (which may include any or all of the components of computer system 800).

Method 400 is generally directed to a situation where a user specifies an increase in the number of days for which television programs recorded based on provider-defined timers are to be retained. In alternate embodiments of method 400, method 400 may also be applied to the situation where the user is adding a television channel to be recorded by provider-defined timers. To add such a television channel to be recorded by provider-defined timers, the television service provider may already have configured the television provider network and the provider-timers to be applicable to the television channel. For example, by default, the provider-defined timers may be applied to a group of four channels. At some point in the past, a user may have selected one of the television channels to not be recorded according to the provider-defined timers. Method 400 may be applied if a user reactivates that television channel to again be recorded according to the provider-defined timers. As such, embodiments of method 400 apply to situations where the amount of space allocated to user-defined timers is decreased while the amount of space allocated to provider-defined timers (and the associated managed arrays) is increased.

At step 410, an indication of provider-defined timers may be received by television receiver from a television service provider. If the television service provider's network is satellite-based, the indication of the provider-defined timers may be received via satellite, such as in system 100 of FIG. 1. The indication of the provider-defined timers may cause provider-defined timers to be set at the television receiver at step 420. The provider-defined timers may indicate: time periods, television channels, and dates for which multiple television channels are recorded.

Such recording may be on a daily basis. As such, in such embodiments, one or more television channels may be recorded on a daily basis. In some embodiments, an array of files is created daily for television channels. If four television channels are to be recorded from 6 to 10 PM, a separate file may be created for each television channel on a daily basis for the 6 to 10 PM time period. Within each of these files may be one or more television programs. For each day, an array of files may be created based on the television programming recorded according to the provider-defined timers. This array may be referred to as a managed array. A separate managed array may exist for each day on which provider-defined timers caused television programming to be recorded. A user may have the ability to enable or disable such provider-defined timers on a channel-by-channel basis. Which television channels are eligible and the times for which these television channels are recorded may be controlled by the television service provider.

The user may have the ability to define how long managed arrays are to be retained by the television receiver. For example, a default value of eight days may be used as a retention period. The user may either increase or decrease this retention period (e.g., the number of days) for which managed arrays are retained. At step 430, user input may be received specifying a number of days for retention of the managed arrays. For each managed array, after the specified number of days have elapsed, the managed array may be "aged out," and deleted from the storage device of the television receiver. Input received from the user at step 430 may be received via an on-screen guide (such as an EPG or configuration screen) generated and output by the television receiver to a display device, such as a television. Via a user input device, such as a remote control, the user may provide input indicating the desired number of days for the retention period. A user may desire to adjust the number of days for multiple reasons. For example, the user may desire to increase the number of days for retention so that the user has the ability to watch television programming broadcast longer ago. The user may desire to decrease the number of days of the retention period so that additional storage space is available at the television receiver. For the purposes of method 400, it is assumed at step 440 that the user has indicated an increased amount of days for the retention period of managed arrays.

At step 440, an amount of space needed for storage of the managed arrays for the retention period indicated by the number of days input by the user at step 430 may be calculated. Such calculation may involve determining an amount of data stored for a previous or average day's managed array and multiplying by the number of days for retention. If the amount of data stored varies per day (e.g., the period of time for which the arrays recorded varies by day), a "worst case" scenario may be used: the maximum possible number of arrays associated with the longest period for recording which may be stored during the retention period may be used for the calculation. In some embodiments, an average daily value may be used. In other embodiments, a predefined value may be stored by the television receiver that indicates a size of an hour (or for a 3 or 4 hour period) of recording for a television channel. Other calculation arrangements are also possible. As an additional example, a predetermined amount of space may be reserved for each day of the retention period.

At step 450, it may be determined whether sufficient storage space is available based on the calculated amount of space on a storage medium of the television receiver. Sufficient storage space may refer to unused space available for television programming recorded due to user-defined timers or space already allocated for storage of managed arrays. Storage allocated for other information (e.g., non-audio/video data) and/or on-demand programming may not be eligible for allocation for managed array storage. If there is sufficient storage space available, method 400 may proceed to step 480. At step 480, the amount of space calculated based on the retention period indicated by the user input may be allocated for storage of managed arrays (television programming recorded based on provider-defined timers). This may involve decreasing an amount of space allocated for storage of television programming recorded based on user-defined timers. As such, after increasing a retention period, the user may notice a decrease in available space for storage of television programming to be recorded based on user-defined timers.

Referring back to step 450, if it is determined that insufficient storage space is available, method 400 may proceed to step 460. At step 460, the television programming recorded based on a user-defined timer may be selected for deletion to make sufficient space. An oldest television program, based on the time and/or date of recording, may be selected for deletion. A user may have the ability to protect particular television programs recorded using user-defined timers. Only television programming that is not protected by user selection may be eligible for deletion at step 460. As such, if the oldest television program recorded based on the user-defined timer has been marked as protected by a user, the next oldest television program (that is not also protected) may be selected for deletion instead. At step 470, the oldest unprotected television program recorded based on the user-defined timer may be deleted. Method 400 may then return to step 450 to determine if sufficient storage space is now available. If so, method 400 may proceed to step 480. If not, step 460 may repeat. As such, steps 460 and 470 may repeat as many times as necessary to free sufficient space for storage of the managed arrays for the retention period. If enough television programs recorded based on user-defined timers have been designated as protected and not enough space can be freed by deleting unprotected television programming, recording of the managed arrays may cease when all available space is used. Alternatively, an error message may be presented to the user and/or the user may be provided with the opportunity to designate protected television programming as unprotected or for deletion.

Figure 5:
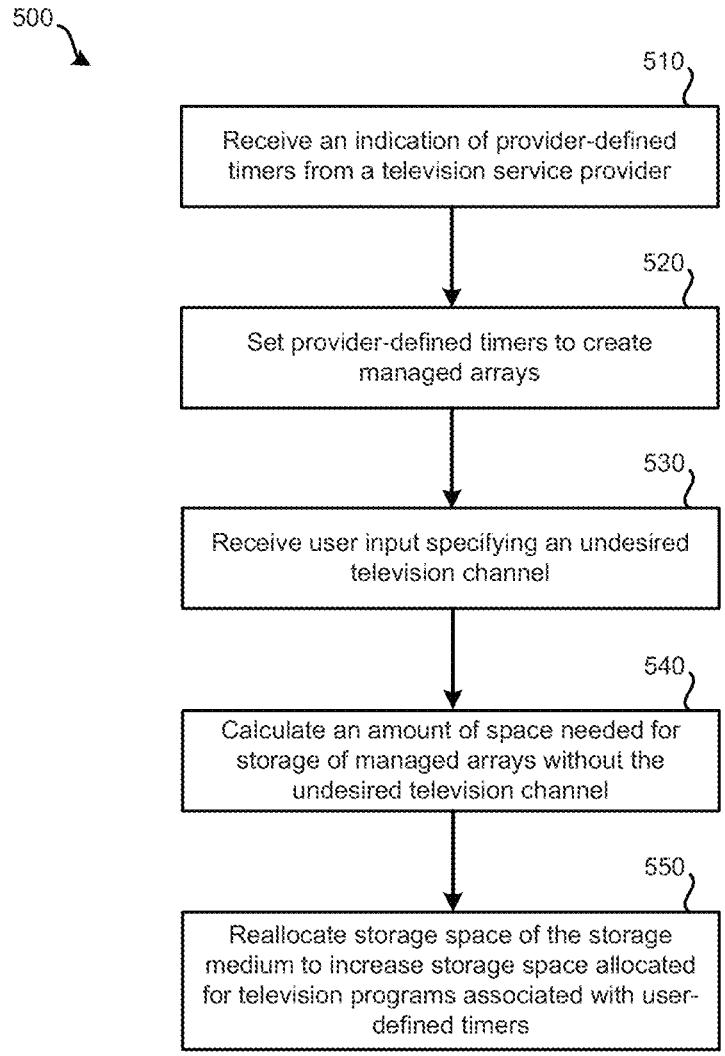
FIG. 5 illustrates another embodiment of a method for managing television programming storage at a television receiver.

FIG. 5 illustrates another embodiment of a method 500 for managing television programming storage at a television receiver. Method 500 may be performed using the systems and devices previously described. For example, each step of method 500 may be performed using a television receiver, such as television receiver 200 of FIG. 2. It should be understood that other embodiments of television receivers may also be used to perform method 500. Steps of method 500 may be performed using computerized components. As such, the television receiver used to perform method 500 may have some or all of the components described in relation to computer system 800 of FIG. 8. Accordingly, means for performing method 400 include television receivers (which may include any or all of the components described in relation to television receiver 200) and computerized devices (which may include any or all of the components of computer system 800).

Method 500 is generally directed to a situation where a user specifies a television channel that is recorded according to provider-defined timers is to not be recorded. For example, by default, the provider-defined timers may be applied to a group of four channels. Method 500 may be applied if a user determines one of these television channels is not to be recorded according to the provider-defined timers. This may occur, for example, if the user does not like any television programming on a particular television channel. In alternate embodiments of method 500, method 500 may also be applied to the situation where the user is decreasing a retention period for managed arrays. As such, embodiments of method 500 apply to situations where the amount of space allocated to user-defined timers is increased while the amount of space allocated to provider-defined timers (and the associated managed arrays) is decreased.

At step 510, an indication of provider-defined timers may be received by a television receiver from a television service provider. If the television service provider's network is satellite-based, the indication of the provider-defined timers may be received via satellite, such as in system 100 of FIG. 1. The indication of the provider-defined timers may cause provider-defined timers to set at the television receiver at step 520. The provider-defined timers may indicate: time periods, television channels, and dates for which multiple television channels are recorded. Such recording may be on a daily basis. As such, in such embodiments, one or more television channels may be recorded on a daily basis. In some embodiments, an array of files is created daily for television channels. If four television channels are to be recorded from 6 to 10 PM, a separate file may be created for each television channel on a daily basis for the 6 to 10 PM time period. Within each of these files may be one or more television programs. For each day, an array of files may be created based on the television programming recorded according to the provider-defined timers. This array may be referred to as a managed array. A separate managed array may exist for each day on which provider-defined timers caused television programming to be recorded. A user may have the ability to enable or disable such provider-defined timers on a channel-by-channel basis. Which television channels are eligible and the times for which these television channels are recorded may be controlled by the television service provider.

At step 530, user input may be received that specifies one or more undesired television channels from among television channels recorded via the provider-timers. For the remainder of method 500, it is assumed that only a single television channel is indicated via user input as undesired. Input received from the user at step 530 may be received via an on-screen guide (such as an EPG or configuration screen) generated and output by the television receiver to a display device, such as a television. Via a user input device, such as a remote control, the user may provide input indicating a television channel that is not desired to be recorded. A user may desire to decrease the number of television channels recorded using provider-defined timers for multiple reasons. For example, the user may desire to decrease the number of television channels recorded such that additional storage space is available for television programming to be recorded via user-defined timers.

At step 540, an amount of space needed for storage of the managed arrays for only the television channels that are desired by the user at step 530 may be calculated. Such calculation may involve determining an amount of data stored for a particular television channel's daily file and multiplying by the number of days for retention and the number of television channels to be recorded. If the amount of data stored varies per day (e.g., the period of time for which the arrays recorded varies by day), a "worst case" scenario may be used: the maximum possible number of arrays associated with the longest period for recording which may be stored during the retention period for each television channel to be recorded may be used for the calculation. In some embodiments, an average daily value for each television channel file may be used. In other embodiments, a predefined value may be stored by the television receiver that indicates a size of an hour (or for a 3 or 4 hour period) of recording for a television channel. Other calculation arrangements are also possible. As an additional example, a predetermined amount of space may be reserved for recording of each television channel based on the retention period. Since in method 500 the user indicated an undesired television channel, less storage space will be necessary for the managed arrays because one less television channel will be recorded.

At step 550, storage space of the television receiver's storage medium may be reallocated to store television programming associated with user-defined timers. As such, less storage space may be reserved for managed arrays recorded based on provider-defined timers. Television programming of the undesired television channel will not be recorded based on provider-defined timers. Accordingly, following step 550, more storage space may be available for a user to record television programming according to timers defined by the user.

Figure 6:
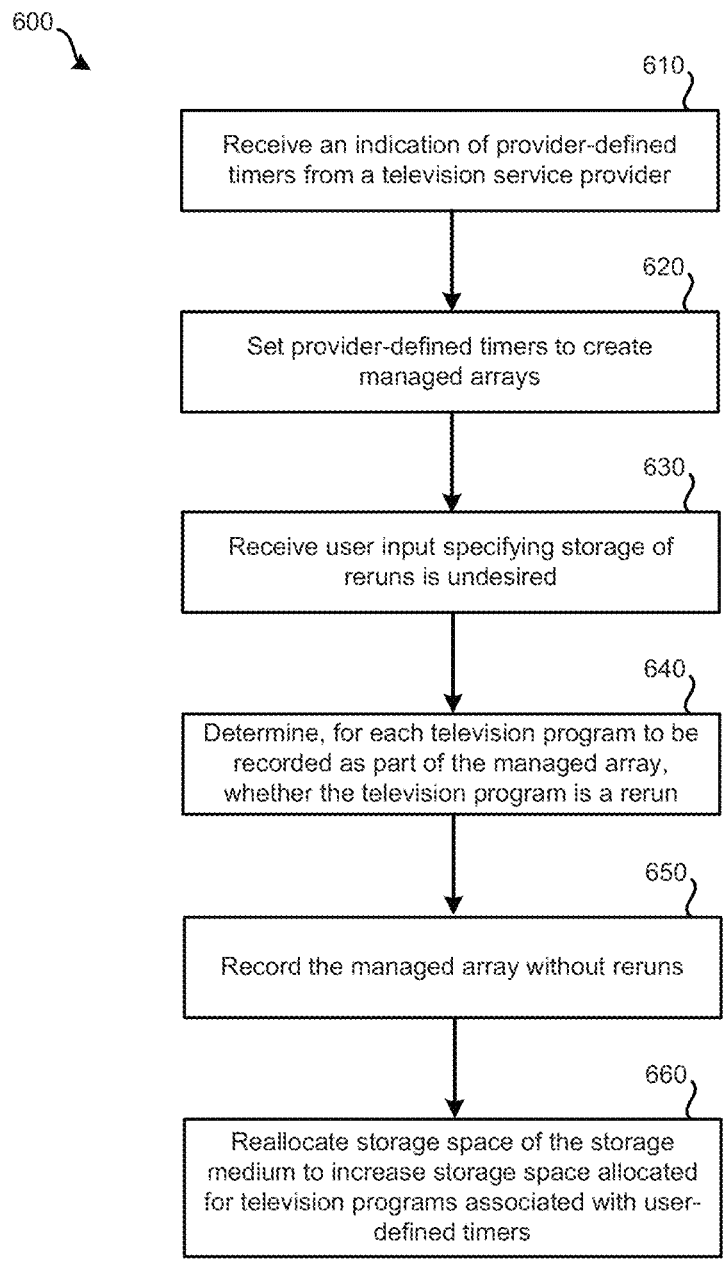
FIG. 6 illustrates an embodiment of a method for managing television programming storage at a television receiver based on user preferences regarding reruns.

FIG. 6 illustrates an embodiment of a method 600 for managing television programming storage at a television receiver based on user preferences regarding reruns. Method 600 may be performed using the systems and devices previously described. For example, each step of method 600 may be performed using a television receiver, such as television receiver 200 of FIG. 2. It should be understood that other embodiments of television receivers may also be used to perform method 600. Steps of method 600 may be performed using computerized components. As such, the television receiver used to perform method 600 may have some or all of the components described in relation to computer system 800 of FIG. 8. Accordingly, means for performing method 600 include television receivers (which may include any or all of the components described in relation to television receiver 200) and computerized devices (which may include any or all of the components of computer system 800).

In method 600, a user may desire that television programming be recorded according to provider-defined timers; however the user may not desire that any television programming be recorded by such defined timers if the television programming is a rerun. A rerun may be defined as television programming that has been previously broadcast on the same or a different television channel, such as at an earlier date. For example, television channels may tend to rerun television programs during the summer from earlier in the year or the previous Fall.

At step 610, an indication of provider-defined timers may be received by television receiver from a television service provider. If the television service provider's network is satellite-based, the indication of the provider-defined timers may be received via satellite, such as in system 100 of FIG. 1. The indication of the provider-defined timers may cause provider-defined timers to be set at the television receiver at step 620. The provider-defined timers may indicate: time periods, television channels, and dates for which multiple television channels are recorded. Such recording may be on a daily basis. As such, in such embodiments, one or more television channels may be recorded on a daily basis. In some embodiments, an array of files is created daily for television channels. If four television channels are to be recorded from 6 to 10 PM, a separate file may be created for each television channel on a daily basis for the 6 to 10 PM time period. Within each of these files may be one or more television programs. For each day, an array of files may be created based on the television programming recorded according to the provider-defined timers. This array may be referred to as a managed array. A separate managed array may exist for each day on which provider-defined timers caused television programming to be recorded. A user may have the ability to enable or disable such provider-defined timers on a channel-by-channel basis. Which television channels are eligible and the times for which these television channels are recorded may be controlled by the television service provider.

At step 630, user input may be received that specifies that storage of reruns recorded based on provider-defined timers is undesired. As such, a user may not desire that managed arrays of files of television programming contain reruns. Input received from the user at step 630 may be received via an on-screen guide (such as an EPG or configuration screen) generated and output by the television receiver to a display device, such as a television. Via a user input device, such as remote control, the user may provide input indicating that storage of reruns is not desired.

Steps 640 and 650 may be performed in multiple ways. In a first set of embodiments, a determination as to whether a television program is a rerun is made before or at the time of recording. The determination may be based on EPG data received and stored by the television receiver which indicates an initial broadcast date of each television program to be recorded based on provider-defined timers. If the television receiver determines at step 640 that an initial broadcast date stored in the EPG information for the television program matches the current date, it may be determined that the television program is not a rerun. If the television receiver determines at step 640 that the initial broadcast date does not match the current date (and is an earlier date), it may be determined that the television program is a rerun. In the first set of embodiments, at step 650, a managed array for a particular day and may be recorded. Recording to a particular file may cease (at least temporarily) such that television programs indicated as reruns are not recorded and stored to the storage device of the television receiver. This may mean that one or more television programs which would be recorded as part of a managed array of files are skipped from recording. Accordingly, while broadcast and possibly received by the television receiver, such reruns may not be stored by the television receiver.

In a second set of embodiments, a determination as to whether a television program is a rerun is made after a managed array is recorded for a particular day. As such, the television channels set for recording based on the provider-defined timers may be recorded regardless of whether any reruns are present at step 650. Step 640 may be performed after step 650 and each television program recorded as part of the managed array determined to be a rerun may be deleted from the managed array. As such, in this second set of embodiments, reruns may be stored temporarily until a determination is made that the television programming is a rerun.

Regardless of whether steps 640 and 650 occur according to the first or second set of embodiments, a "pad" may be added to the scheduled beginning and scheduled end according to EPG data. For example, while EPG data may indicate a rerun is scheduled to run from 8-830 PM, television programs may start or end being broadcast off schedule. As such, recording may only be skipped from 8:05-8:25 PM (a five minute pad) to prevent any of the preceding and/or following television programs from being inadvertently partially skipped from recording or inadvertently deleted. While the example provides for a five minute pad for the beginning and end of reruns, pads of 1, 2, 3, 4, 6 minutes or longer may also be possible. Pads of other lengths or in any length between those identified may also be used. Pads may be used at the beginning and/or end of a rerun. If multiple reruns are present consecutively on a television channel, no pad between the reruns may be present (but a pad before the first rerun and after the second rerun may be present).

At step 660, storage space of the storage medium of the television receiver may be reallocated to increase storage space allocated to allow additional storage of television programming based on user-defined timers. Based upon EPG data being present for multiple days into the future, the television receiver can determine that since reruns are not to be stored according to the user input received at step 630 and reruns are scheduled to be broadcast in the future according to the EPG data, storage space that would have otherwise been used for storage of reruns may instead be allocated to television programming to be recorded based on user-defined timers. If after a period of time for which multiple reruns were scheduled in the future, fewer reruns are scheduled (e.g., the television channels enter a sweeps period), the amount of storage space available for television programming recorded based on user-defined timers may be decreased. This may involve deletion of one or more television programs recorded based on a user-defined timer, such as detailed in method 400 of FIG. 4. As such, if storage is to be allocated among user-defined and provider-defined timers according to whether reruns are present on the television channels to be recorded based on the provider-defined timers, the amount of space available for recording of television programming based on user-defined timers may vary based on the number/length of reruns scheduled on television channels to be recorded based on provider-defined timers.

Figure 7:
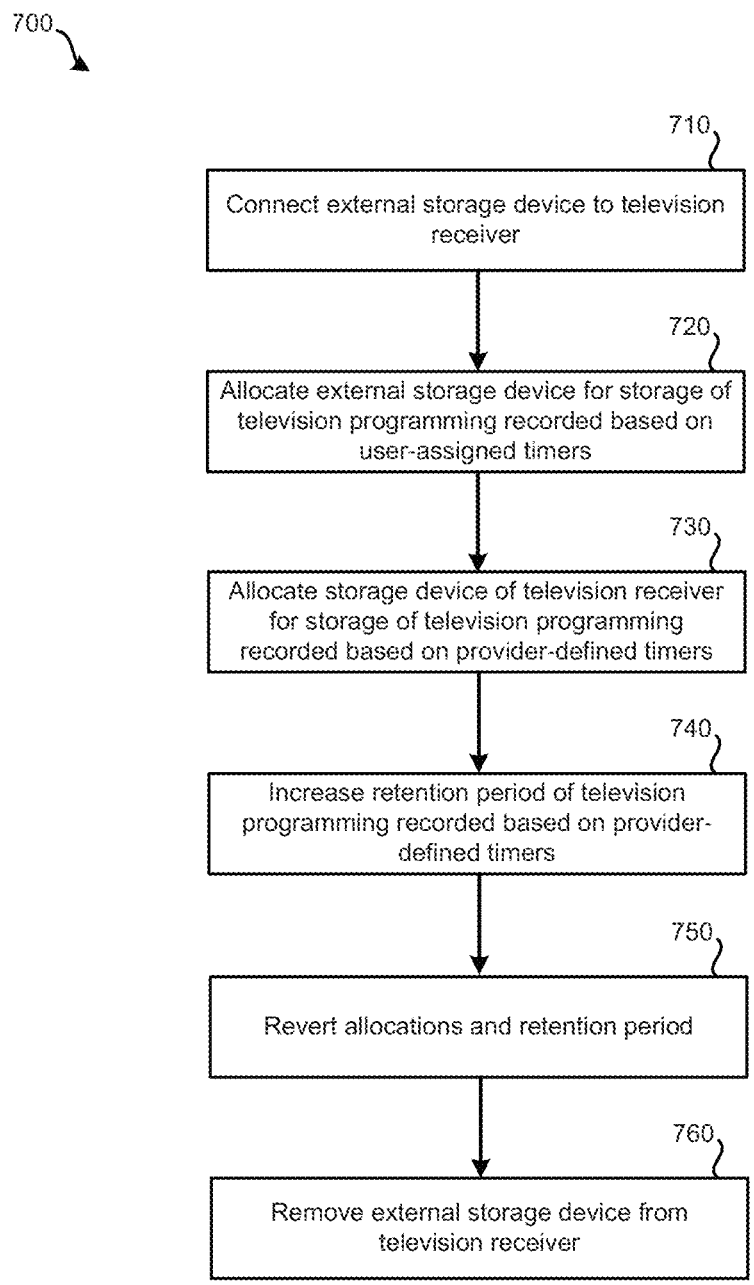
FIG. 7 illustrates an embodiment of a method for allocating storage space based on an external storage device being connected with a television receiver.

FIG. 7 illustrates an embodiment of a method 700 for allocating storage space based on an external storage device being connected with a television receiver. Method 700 may be performed using the systems and devices previously described. For example, each step of method 700 may be performed using a television receiver, such as television receiver 200 of FIG. 2. To perform method 700, an external device, such as external device 252 may be connected with the television receiver. It should be understood that other embodiments of television receivers may also be used to perform method 700. Steps of method 700 may be performed using computerized components. As such, the television receiver used to perform method 700 may have some or all of the components described in relation to computer system 800 of FIG. 8. Accordingly, means for performing method 700 include television receivers (which may include any or all of the components described in relation to television receiver 200), one or more external storage devices, and computerized devices (which may include any or all of the components of computer system 800).

In many embodiments, a television receiver may have a significant amount of storage, such as two terabytes. However, other television receivers may have significantly less storage space. Further, for such other television receivers much stored data, such as EPG data, table data (e.g., "other" non-audio/video information previously detailed) and on-demand content may consume a significant amount of the storage medium's storage space. As such, much less space may be available for television programming recorded based on user-defined and/or provider-defined timers. As such, an external storage device may be connected to increase storage capacity of the television receiver. At step 710, a non-transitory external storage device, such as a hard drive or non-volatile memory, may be connected to the television receiver.

At step 720, upon detecting the presence of the external storage device, the television receiver may allocate the external storage device for storage of television programming recorded based on user assigned timers. Such allocation may involve television programming previously recorded based on user-assigned timers being transferred from the storage device of the television receiver to the external storage device. Accordingly, following step 720, television programming previously recorded based on user-defined timers may be transferred to the external storage device for storage.

At step 730, storage space of the television receiver storage device may be reallocated from being partially assigned to television programming recorded based on user-defined timers to other purposes, such as television programming recorded based on provider-defined timers. Following step 730, future user-defined timers may result in television programming being recorded to the external storage device, while provider-defined timers may result in television programming being recorded to the storage device of the television receiver. While in the illustrated embodiment of method 700 the external device is used for user assigned timers and the internal storage device is used for provider assigned timers, it should be understood that this assignment can be reversed.

At step 740, since additional storage space is available on the storage device of the television receiver (such as due to television programming recorded based on user-defined timers being moved to the external storage device), television programming recorded based on provider-defined timers may be retained for a longer period of time, thus allowing users access to a greater amount of television programming for playback. Based on the space available on the storage device of the television receiver, the television receiver may calculate a new retention period. In some embodiments, for retention of television programming recorded based on provider-defined timers, the user may be invited to specify new length of time for the retention period. In some embodiments, in addition or alternately to increasing the retention period, the number of television channels recorded based on provider-defined timers may be increased. Additionally or alternatively, if reruns were previously not recorded based on provider defined timers, such reruns may begin being recorded and stored.

In embodiments, where television programming recorded based on provider-defined timers is stored to the external storage device, rather than a particular retention period being defined, the external storage device may be filled. The oldest television programming recorded based on provider-defined timers may be deleted as necessary to accommodate storage of new television programming that is recorded based on provider defined timers. As such, the external storage device may be kept approximately full and thus may provide a user with a maximized amount of stored television programming for playback.

After a period of time, a user may specify that the external storage device is to be removed. This information may be provided in the form of user input to the television receiver. At step 750, the allocations and changes to the retention period and/or channels being recorded based on provider-defined timers may be reverted to the previous settings. In some embodiments, television programming recorded based on user-assigned timers may be transferred back to the storage device of the television receiver. Following step 750, the storage device of the television receiver may again be allocated in part to television programming recorded based on user-defined timers and television programming recorded based on provider defined timers. At step 760, the external storage device may be removed from the television receiver.

In some embodiments, rather than the user input being provided that indicates the external storage device will be removed from television receiver, a user may simply remove the external storage device (e.g., by unplugging a USB cable). In such instances, the allocations may remain unchanged at the television receiver; however, a user may not have access to television programming stored on the external storage device. In some embodiments, following the external storage device being removed at step 750, the allocation of the storage device of the television receiver may be reallocated such that storage space is allocated for television programming to be recorded based on user-defined timers and television recording to be recorded based on provider-defined timers.

Figure 8:
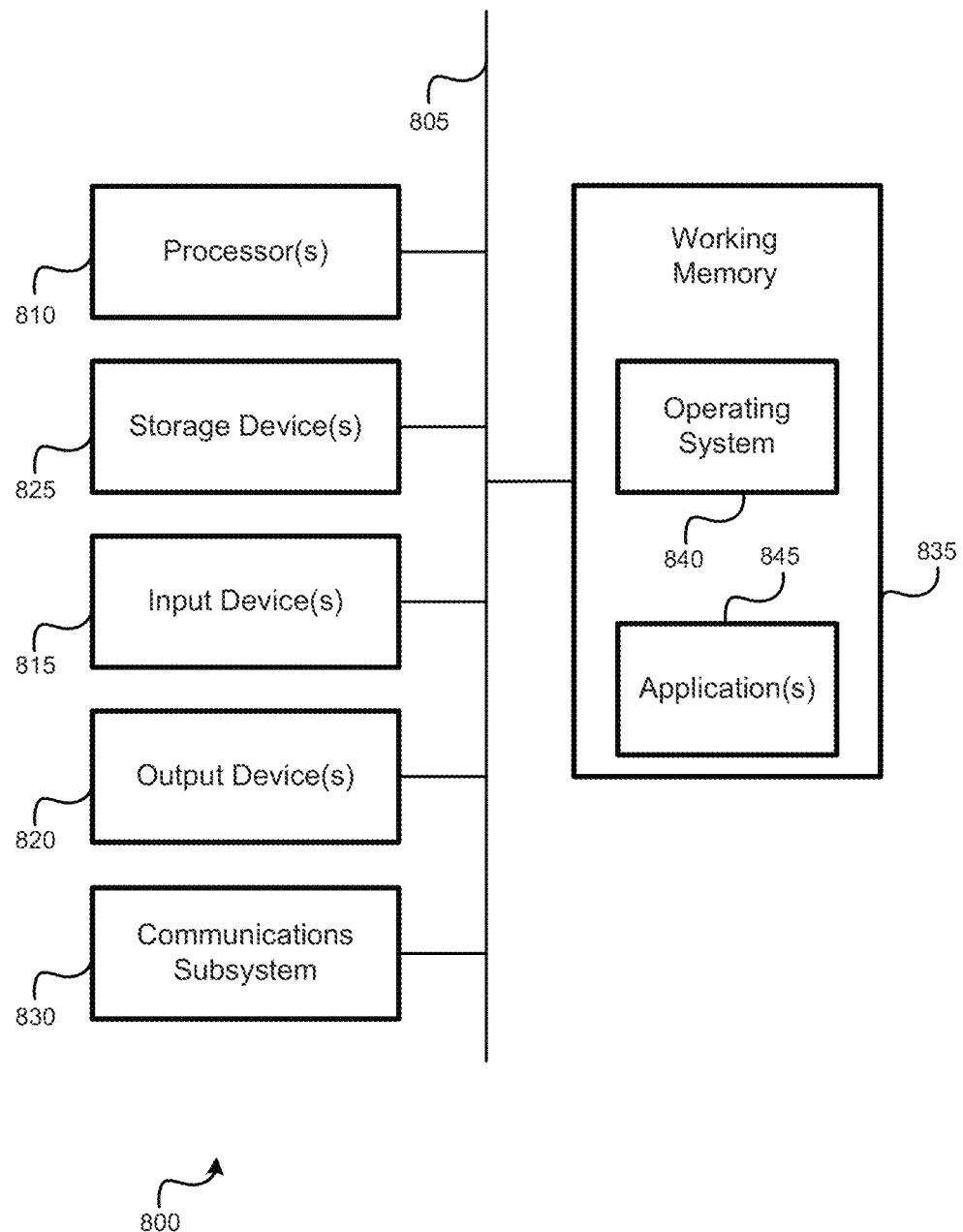
FIG. 8 illustrates an embodiment of a computer system.

A computer system as illustrated in FIG. 8 may be incorporated as part of the previously described computerized devices. For example, computer system 800 can represent some of the components of the television receivers and/or television service provider systems. FIG. 8 provides a schematic illustration of one embodiment of a computer system 800 that can perform the methods provided by various embodiments. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, and/or the like); one or more input devices 815, which can include without limitation a mouse, a keyboard, and/or the like; and one or more output devices 820, which can include without limitation a display device, a printer, and/or the like.

The computer system 800 may further include (and/or be in communication with) one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 830 may permit data to be exchanged with a network (such as the network described below, to name one example), other computer systems, and/or any other devices described herein. In many embodiments, the computer system 800 will further comprise a working memory 835, which can include a RAM or ROM device, as described above.

The computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 825 described above. In some cases, the storage medium might be incorporated within a computer system, such as computer system 800. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 800) to perform methods in accordance with various embodiments of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the non-transitory storage device(s) 825. Merely by way of example, execution of the sequences of instructions contained in the working memory 835 might cause the processor(s) 810 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 830 (and/or components thereof) generally will receive signals, and the bus 805 then might carry the signals (and/or the data, instructions, etc. carried by the signals) to the working memory 835, from which the processor(s) 810 retrieves and executes the instructions. The instructions received by the working memory 835 may optionally be stored on a non-transitory storage device 825 either before or after execution by the processor(s) 810.

It should further be understood that the components of computer system 800 can be distributed across a network. For example, some processing may be performed in one location using a first processor while other processing may be performed by another processor remote from the first processor. Other components of computer system 800 may be similarly distributed.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bind the scope of the claims.

What is claimed is:

1. A system for managing television programming storage, the system comprising:
    a television receiver, comprising:
        one or more tuners configured to receive television programming via a television service provider distribution network;
        a television interface configured to output the television programming to a display device;
        one or more processors; and
        a memory communicatively coupled with and readable by the one or more processors and having stored therein processor-readable instructions which, when executed by the one or more processors, cause the one or more processors to:
            receive user input via a user interface of the television receiver specifying a number of days for retention of each managed array of a plurality of managed arrays of television channels to be recorded by a television receiver, wherein:
                a television service provider selects a plurality of television channels for recording within the plurality of managed arrays of television channels;
            receive, via a tuner of the one or more tuners, from the television service provider distribution network, indications of time periods for recording of the plurality of television channels of the plurality of managed arrays of television channels;
            calculate a first amount of storage space for storage of the plurality of managed arrays of television channels based on the number of days for retention; and
            allocate the first amount of storage space of a storage medium to the plurality of managed arrays of television channels.

2. The system for managing television programming storage of claim 1, wherein the processor-readable instructions, when executed, further cause the one or more processors to:
    determine the first amount of storage space for the plurality of managed arrays of television channels exceeds available space of the storage medium.

3. The system for managing television programming storage of claim 2, wherein the processor-readable instructions, when executed, further cause the one or more processors to:

in response to determining the first amount of storage space for the plurality of managed arrays of television channels exceeds available space of the storage medium, select a television program stored by the storage medium, wherein
the television program was recorded by the television received based on a user-defined timer; and
the television program is selected based on the television channel having an older date of recording than other television programs stored by the storage medium.

4. The system for managing television programming storage of claim 3, wherein the processor-readable instructions, when executed, further cause the one or more processors to:
delete the selected television program.

5. The system for managing television programming storage of claim 3, wherein the television program is not protected, wherein protection is specified by user-input to the television receiver.

6. The system for managing television programming storage of claim 5, wherein:
at least a second television program stored by the storage medium was recorded by the television received based on a second user-defined timer;
the second television program has an oldest date of recording compared to all television programs stored by the television received recorded based on user-defined timers; and
the second television program is protected.

7. The system for managing television programming storage of claim 1, wherein the processor-readable instructions, when executed, further cause the one or more processors to:
allocate a second amount of storage space of the storage medium to on-demand programming storage.

8. The system for managing television programming storage at the television receiver of claim 7, wherein:
a portion of storage space of the storage medium remaining following allocation of the first amount of storage space and the second amount of storage space is used for storage of television programs recorded based on user-defined timers.

9. The system for managing television programming storage of claim 1, wherein the processor-readable instructions, when executed, further cause the one or more processors to:
receive user input specifying an undesired television channel to not be recorded as part of the plurality of managed arrays of television channels to be recorded by the television receiver;
recalculate the first amount of storage space for storage of the plurality of managed arrays of television channels without the undesired television channel; and
allocate a third amount of storage space of the storage medium to the plurality of managed arrays of television channels without the undesired television channel, wherein:
the third amount of storage space of the storage medium is allocated instead of the first amount of storage space of the storage medium; and
the third amount of storage space of the storage medium is less than the first amount of storage space of the storage medium.

10. The system for managing television programming storage of claim 1, wherein the processor-readable instructions, when executed, further cause the one or more processors to:
receive user input indicating rerun television programming is not to be stored by the television receiver; and
determine if each television program within a managed array of television channels is a rerun based on an original broadcast date indicated in electronic programming guide information.

11. The system for managing television programming storage of claim 10, wherein the processor-readable instructions, when executed, further cause the one or more processors to:
in response to determining a television program within the managed array of television channels is the rerun, cause the television program to not be stored.

12. A method for managing television programming storage at a television receiver, the method comprising:
receiving the television receiver, user input via a user interface of the television receiver, the user input specifying a number of days for retention of each managed array of a plurality of managed arrays of television channels to be recorded by the television receiver, wherein:
a television service provider selects a plurality of television channels for recording as the plurality of managed arrays of television channels;
receiving, via a tuner of the television receiver, from the television service provider distribution network, indications of time periods for recording of the plurality of television channels of the plurality of managed arrays of television channels;
calculating, by the television receiver, a first amount of storage space for storage of the plurality of managed arrays of television channels based on the number of days for retention; and
allocating, by the television receiver, the first amount of storage space of a storage medium of the television receiver to the plurality of managed arrays of television channels.

13. The method for managing television programming storage at the television receiver of claim 12, further comprising:
receiving, from a user, selection of a subset of television channels to record from the plurality of television channels, wherein the calculating comprises:
calculating the first amount of storage space for storage of the plurality of managed arrays of television channels based on the number of days for retention and a number of television channels in the subset of television channels.

14. The method for managing television programming storage at the television receiver of claim 12, further comprising:
determining the first amount of storage space for the plurality of managed arrays of television channels exceeds available space of the storage medium.

15. The method for managing television programming storage at the television receiver of claim 14, further comprising:
in response to determining the first amount of storage space for the plurality of managed arrays of television channels exceeds available space of the storage medium, selecting a television program stored by the storage medium, wherein
the television program was recorded by the television received based on a user-defined timer; and
the television program is selected based on the television channel having an older date of recording than other television programs stored by the storage medium.

16. The method for managing television programming storage at the television receiver of claim 15, further comprising:
deleting the selected television program.

17. The method for managing television programming storage at the television receiver of claim 15, wherein the television program is not protected, wherein protection is specified by user-input to the television receiver.

18. The method for managing television programming storage at the television receiver of claim 17, wherein:
- at least a second television program stored by the storage medium was recorded by the television received based on a second user-defined timer;
- the second television program has an oldest date of recording compared to all television programs stored by the television received recorded based on user-defined timers; and
- the second television program is protected.

19. The method for managing television programming storage at the television receiver of claim 12, further comprising:
- allocating a second amount of storage space of the storage medium to on-demand programming storage.

20. The method for managing television programming storage at the television receiver of claim 19, wherein:
- a portion of storage space of the storage medium remaining following allocation of the first amount of storage space and the second amount of storage space is used for storage of television programs recorded based on user-defined timers.

21. A non-transitory processor-readable medium for managing television programming storage stored by a television receiver, comprising processor-readable instructions configured to cause one or more processors to:
- receive user input via a user interface of the television receiver specifying a number of days for retention of each managed array of a plurality of managed arrays of television channels to be recorded by a television receiver, wherein:
  - a television service provider selects a plurality of television channels for recording within the plurality of managed arrays of television channels;
- receive, via a tuner of the television receiver from the television service provider distribution network, indications of time periods for recording of the plurality of television channels of the plurality of managed arrays of television channels;
- calculate a first amount of storage space for storage of the plurality of managed arrays of television channels based on the number of days for retention; and
- allocate the first amount of storage space of a storage medium to the plurality of managed arrays of television channels.

* * * * *